July 31, 1934.  
J. BRICKEN, NOW BY JUDICIAL CHANGE OF NAME J. G. BEAVER  
CALCULATING MACHINE  
Filed Feb. 28, 1931
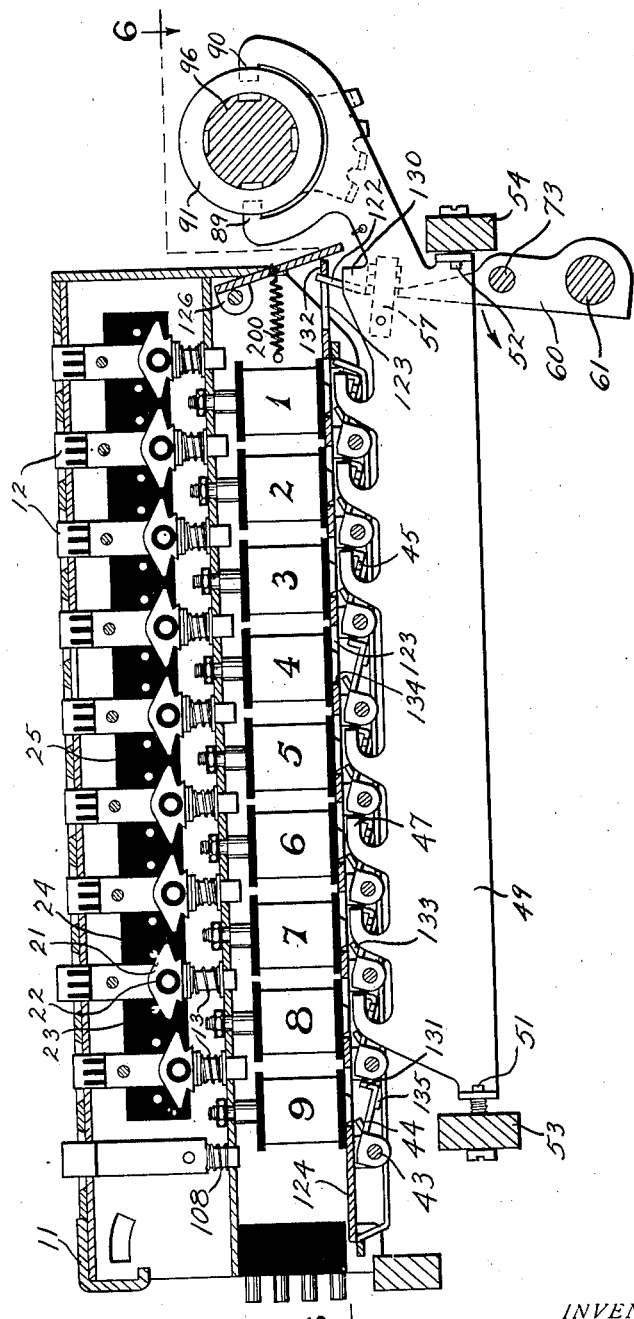
INVENTOR  
John Bricken  
BY  
Stuart Hilder  
ATTORNEY

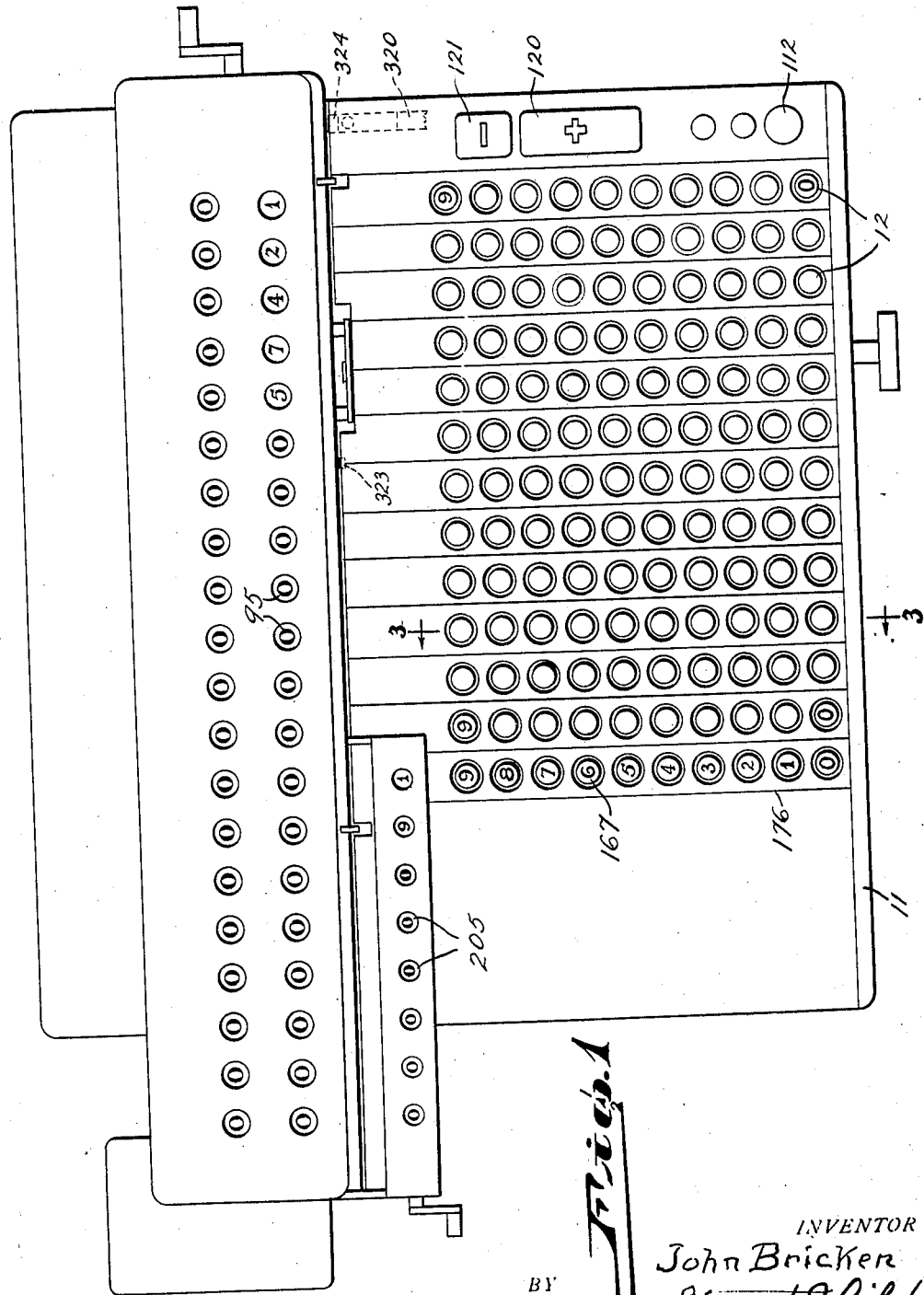

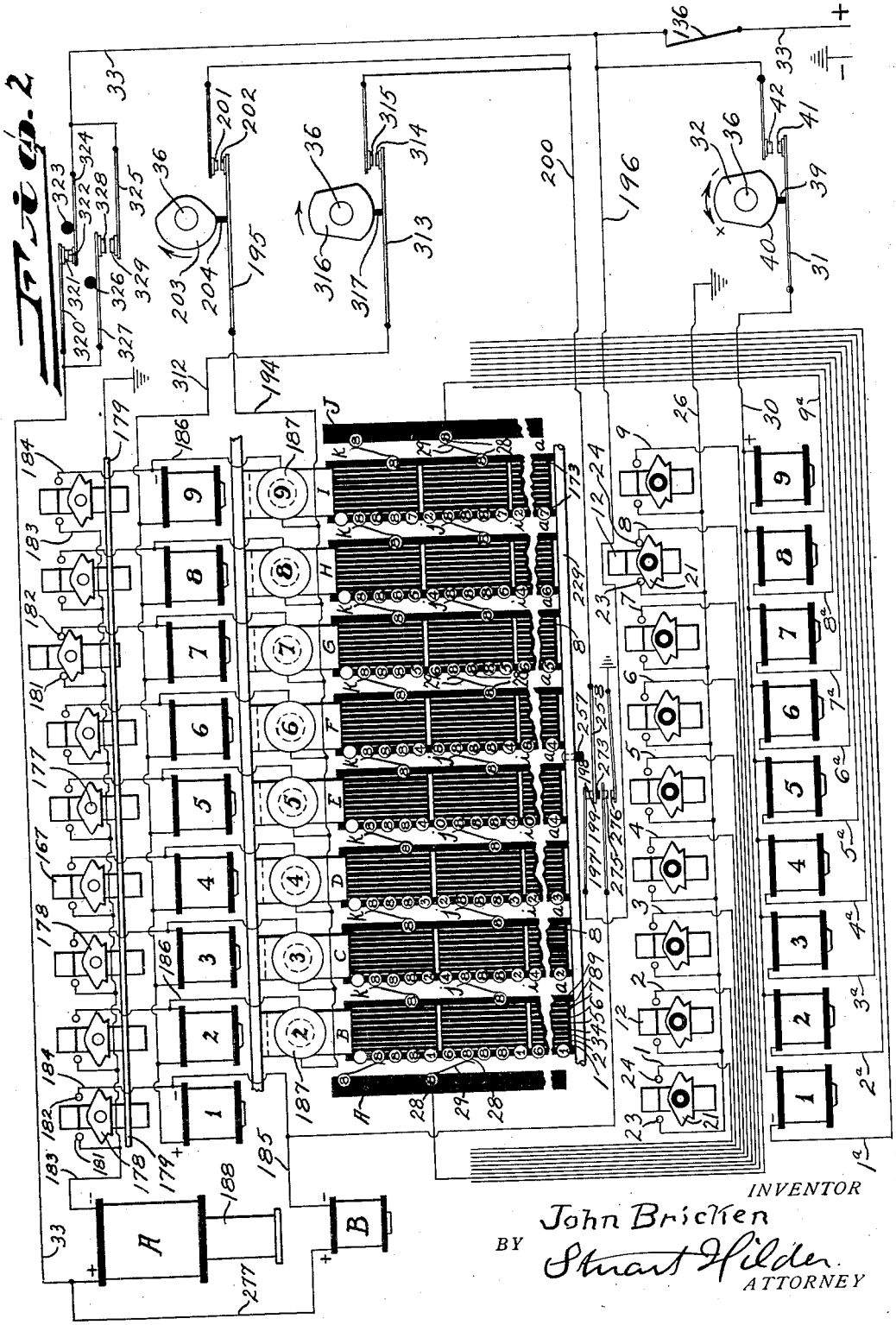

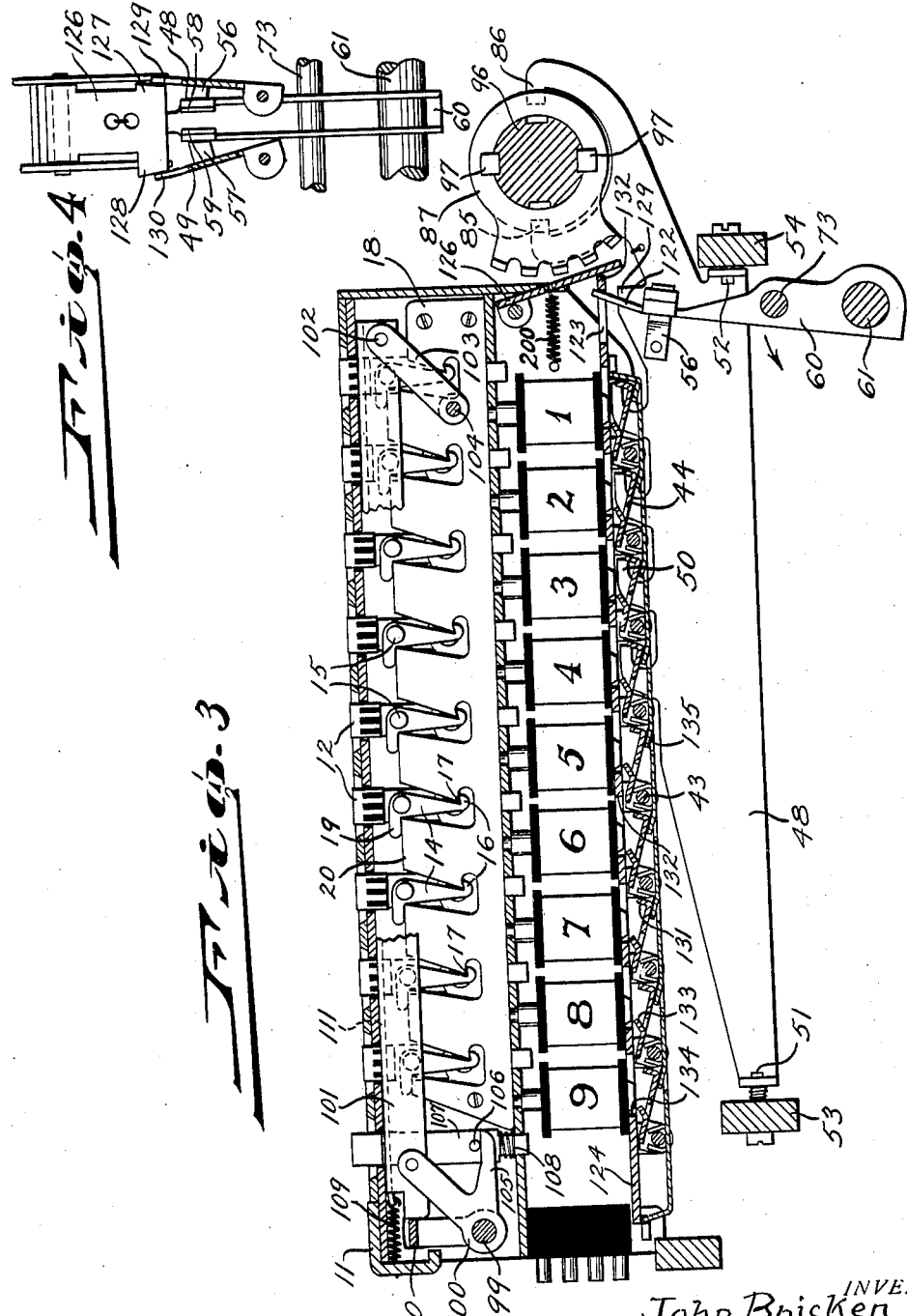

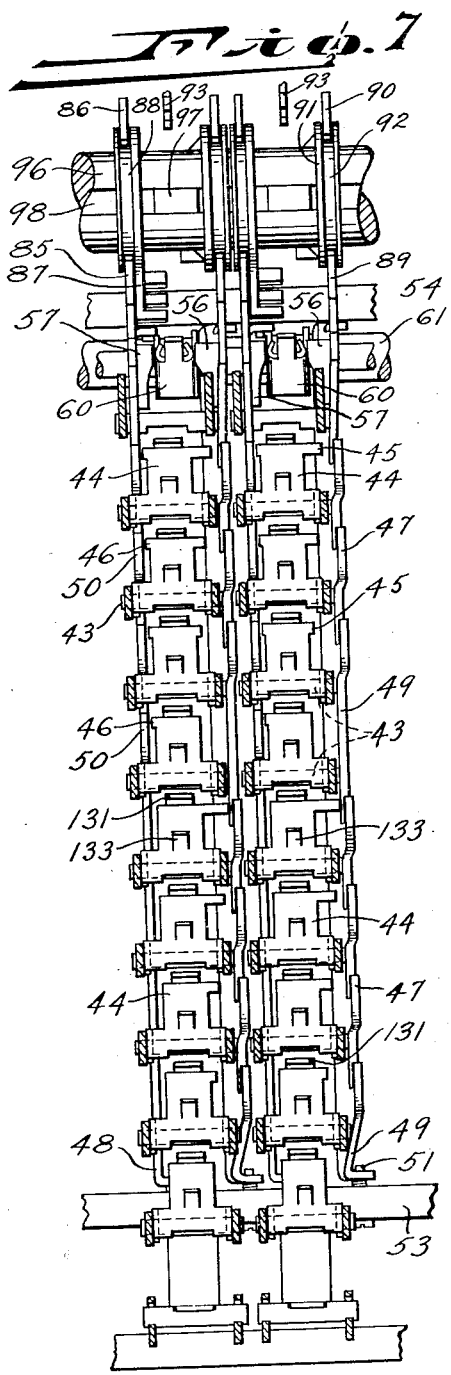
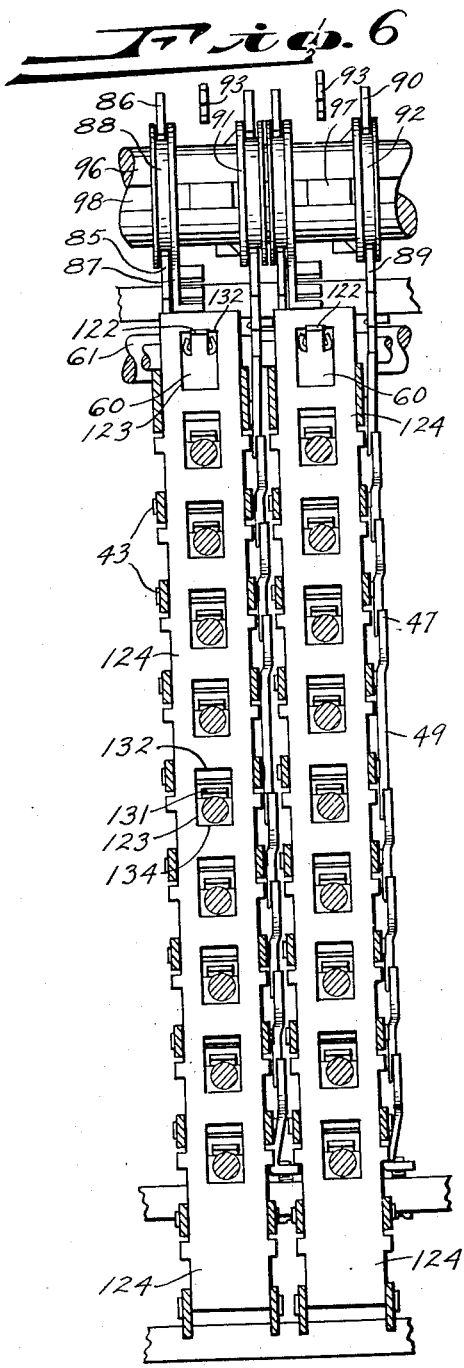

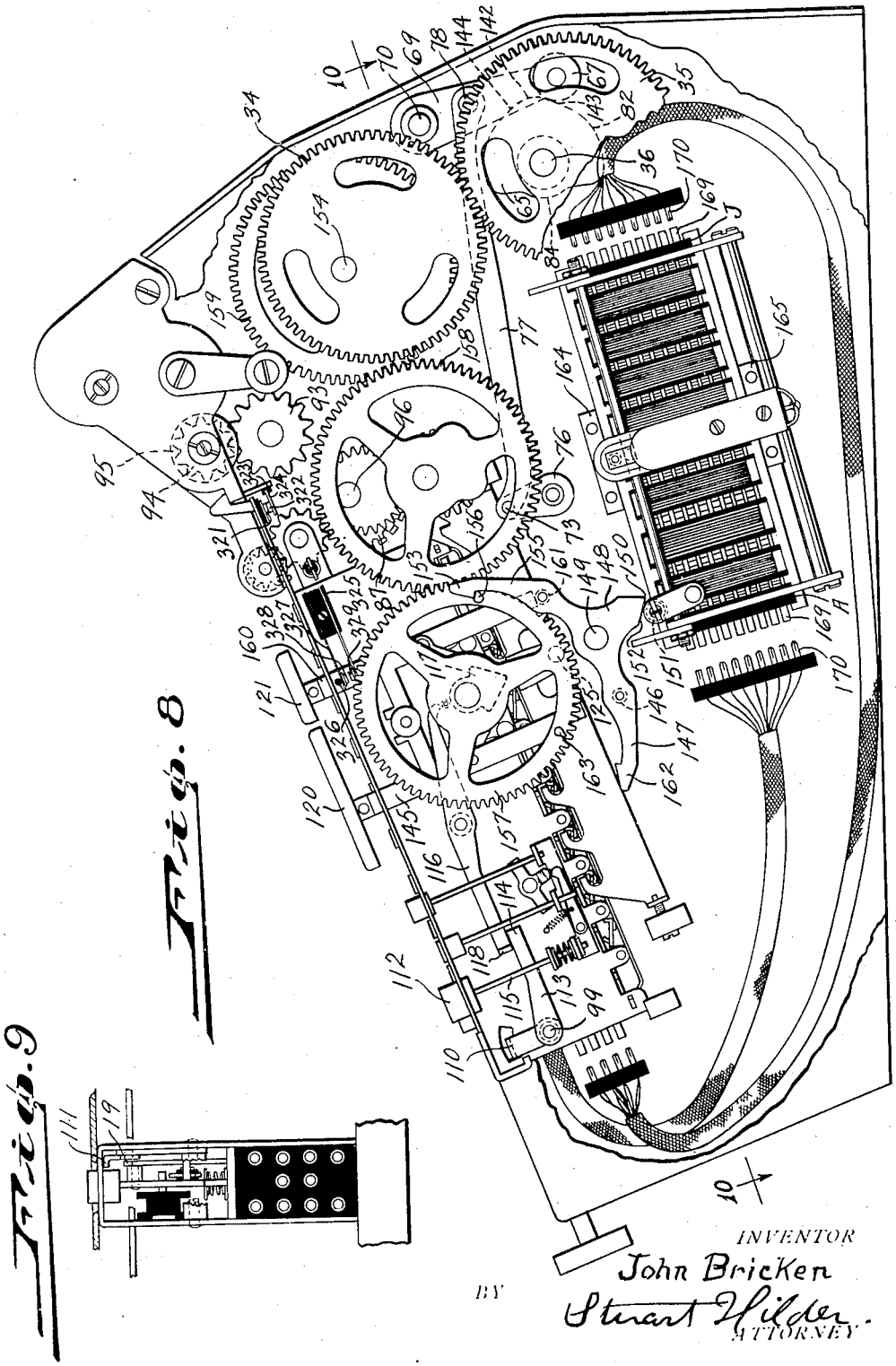

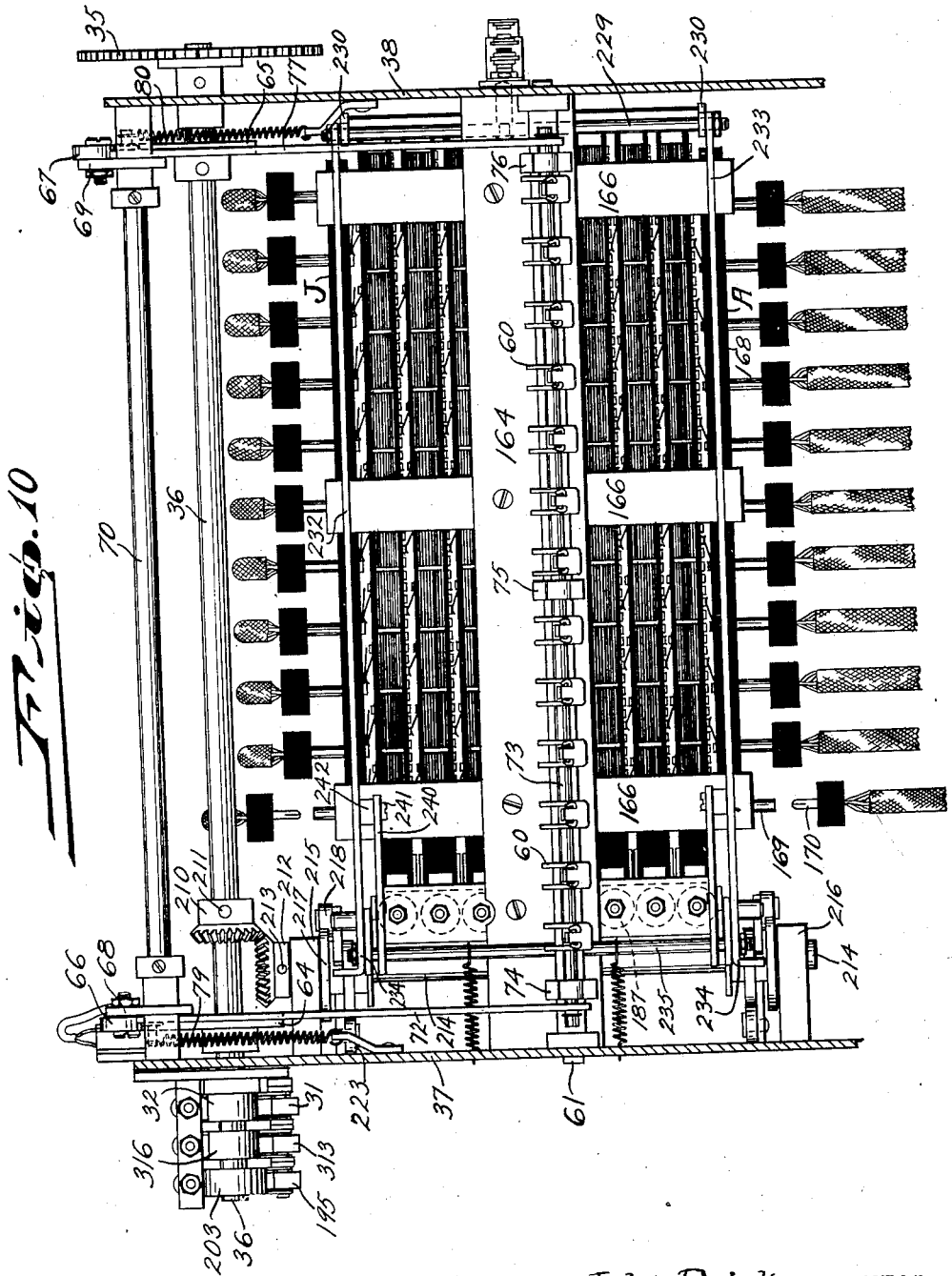

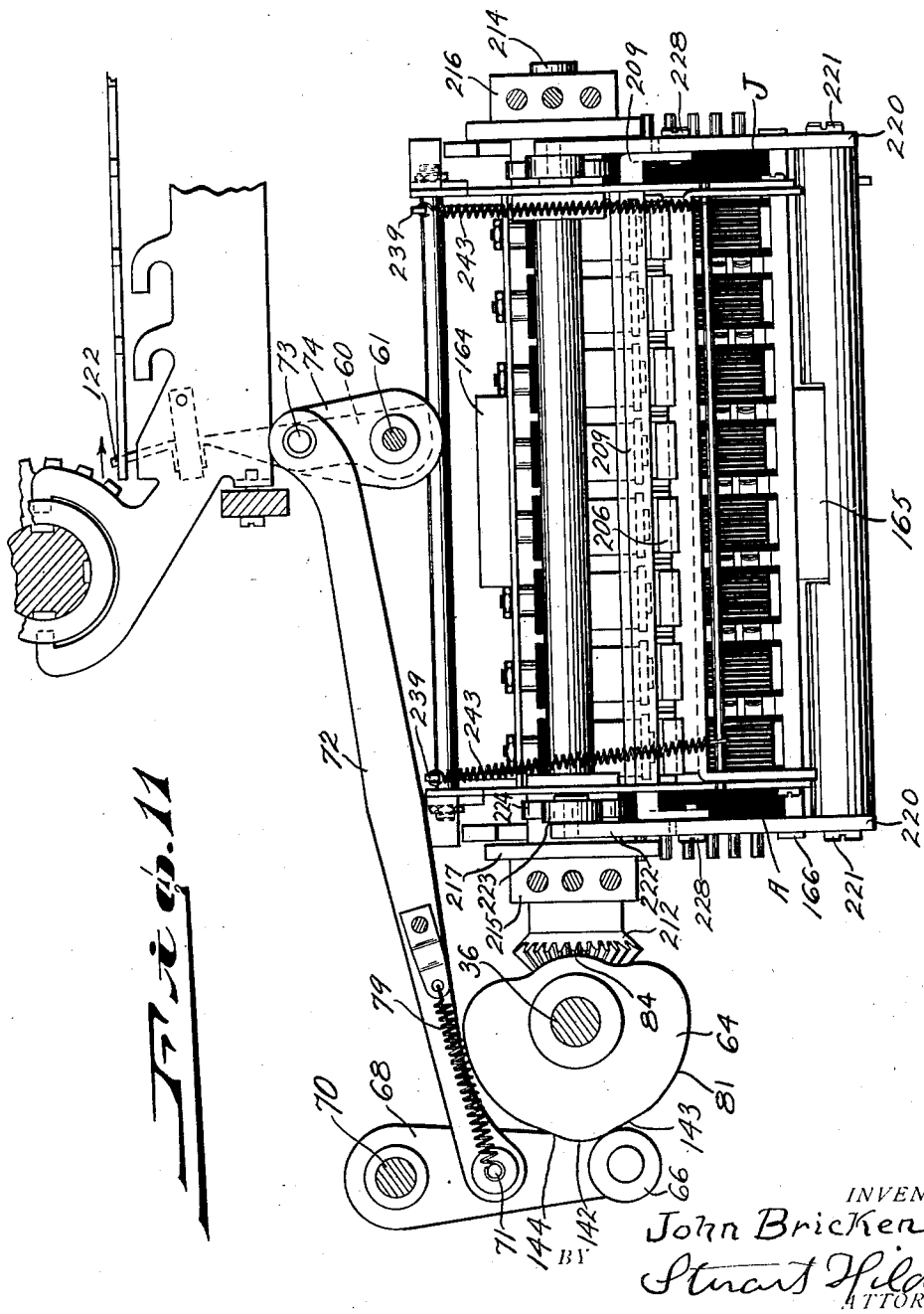

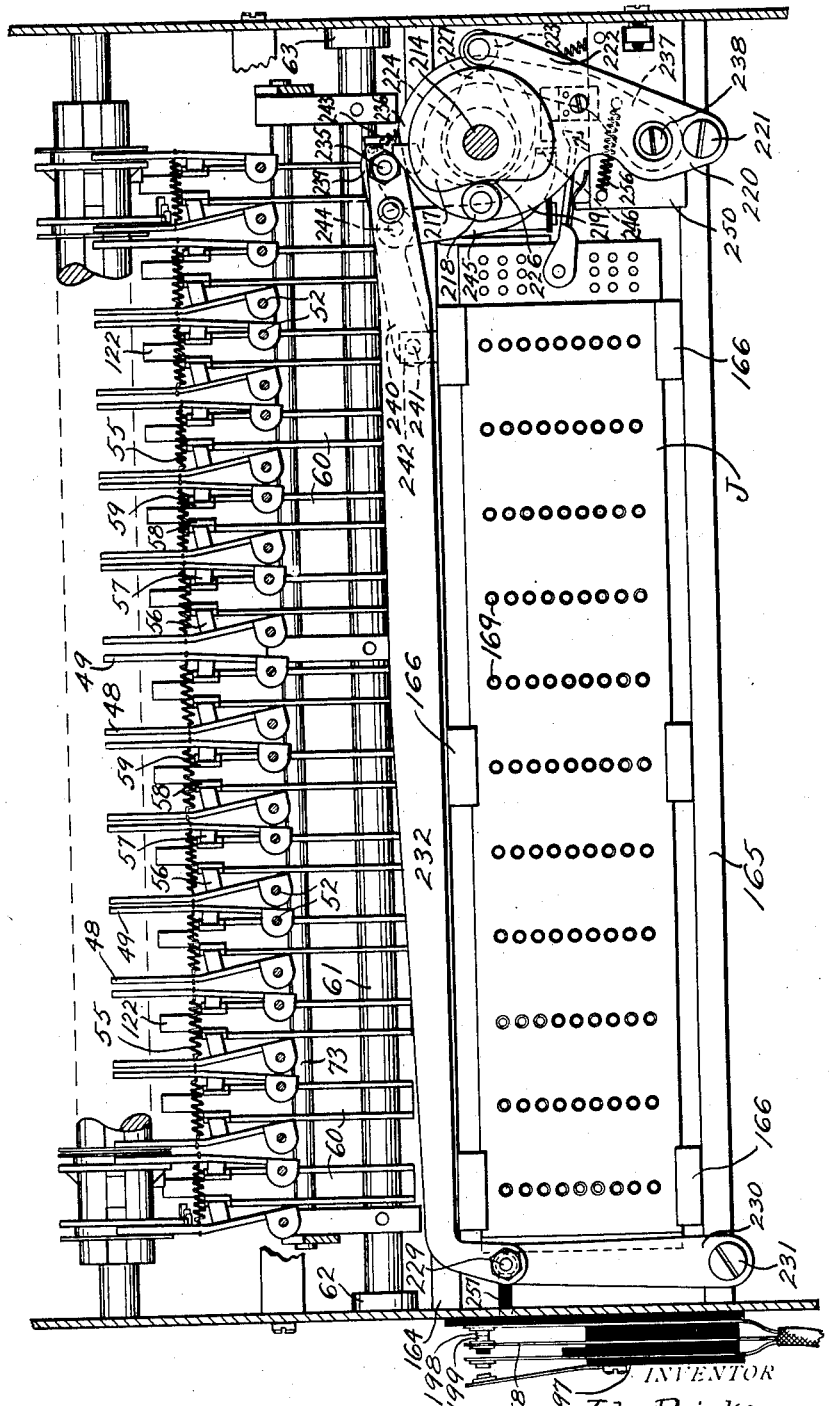

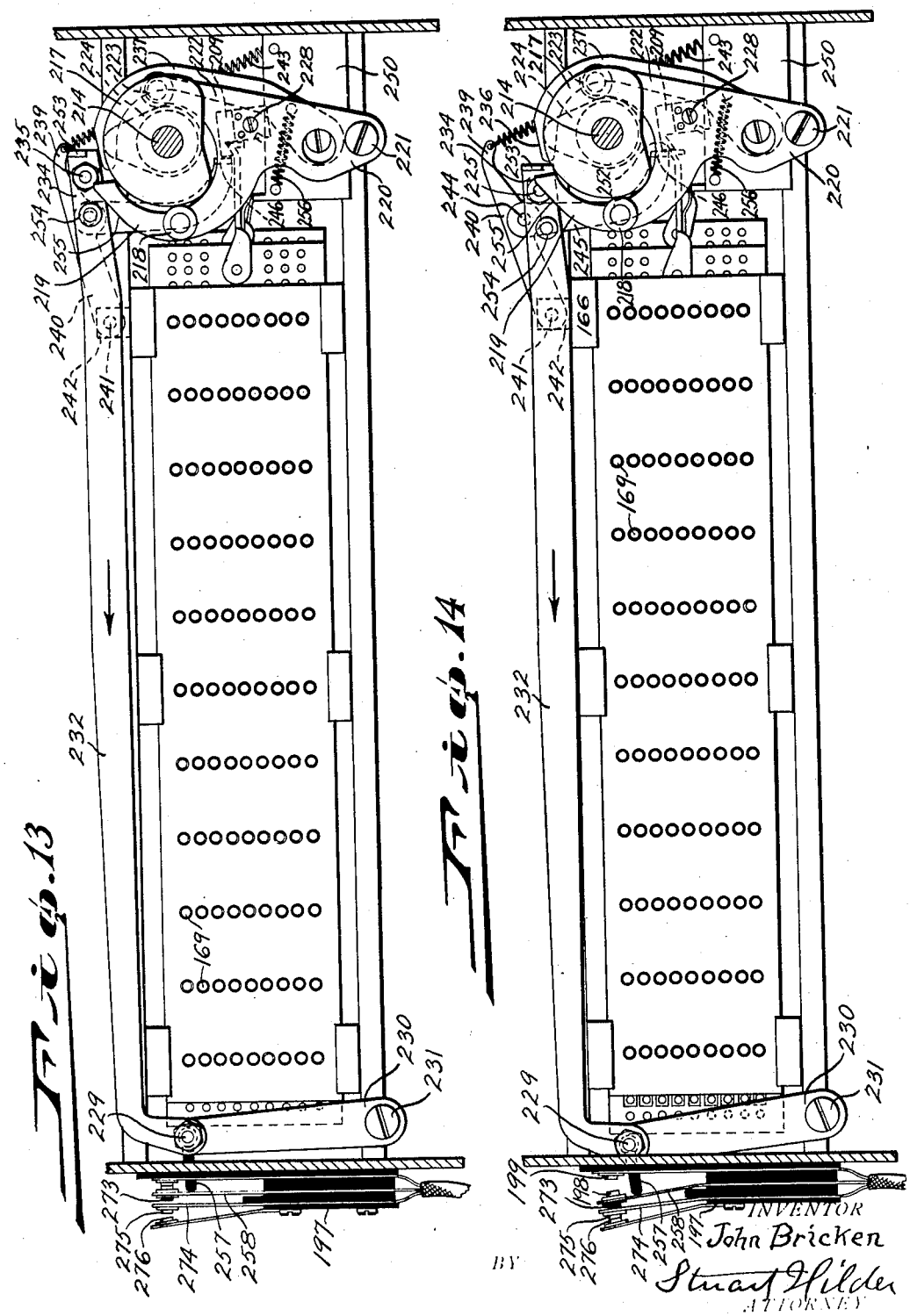

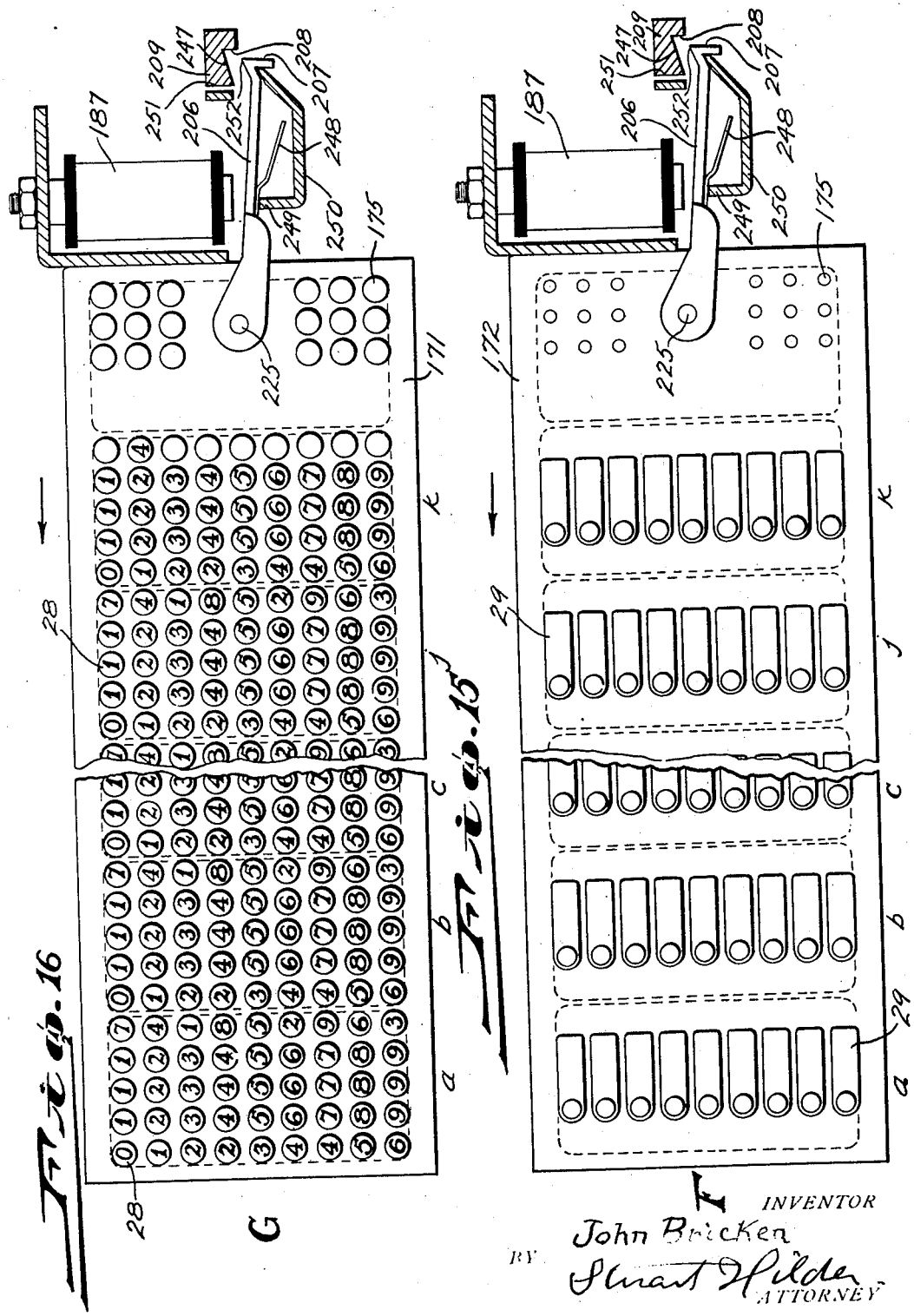

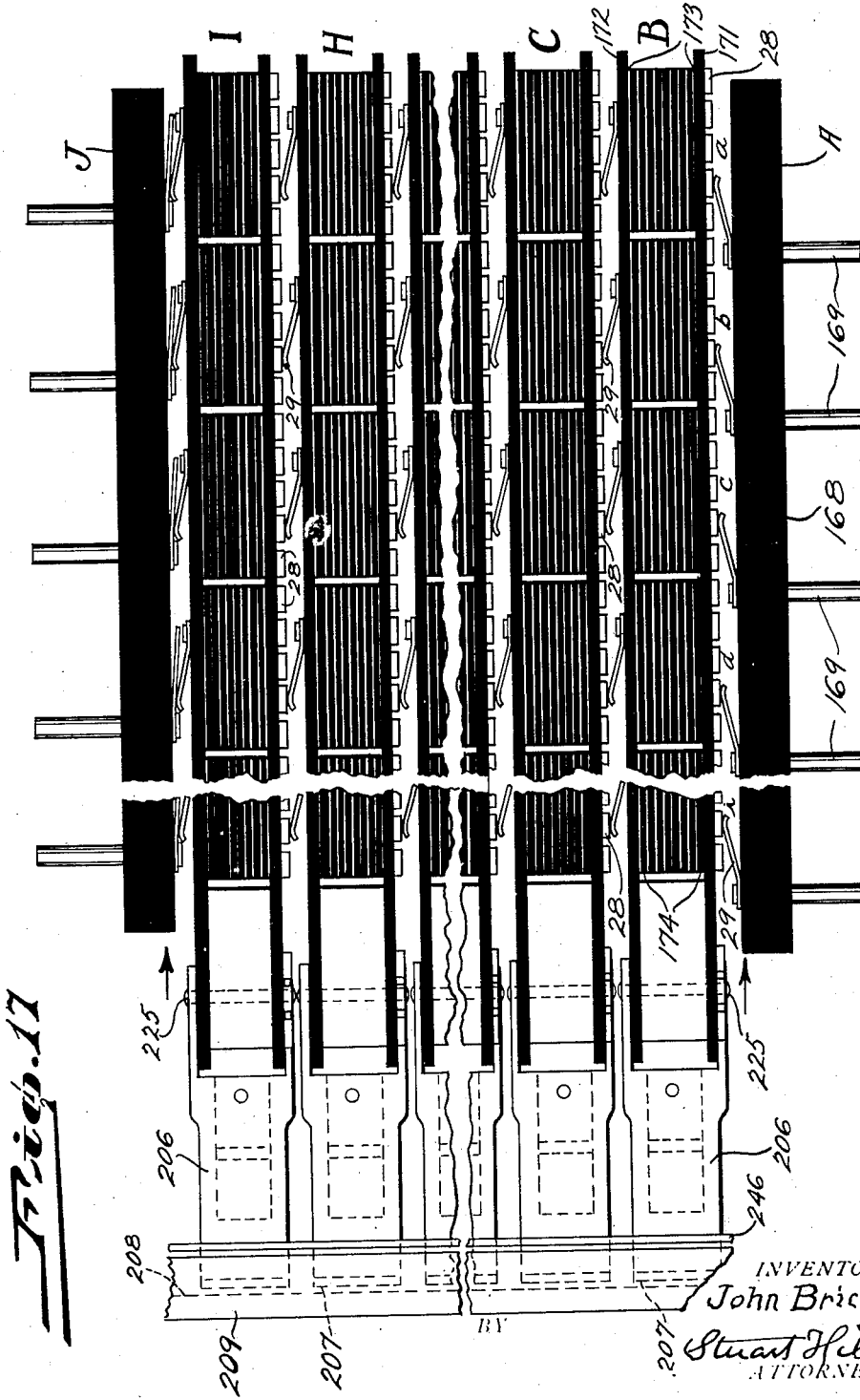

Fig. 18
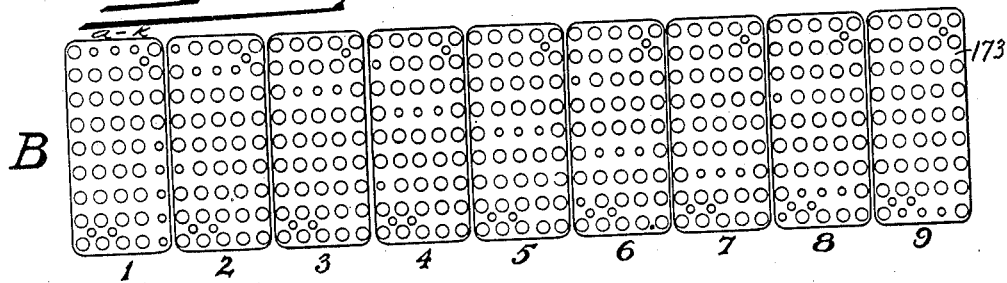
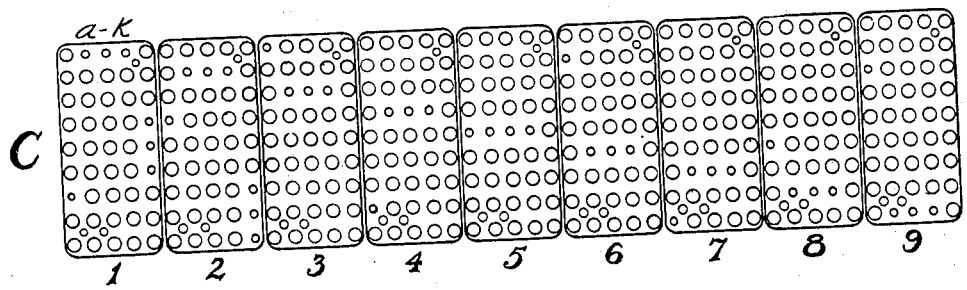
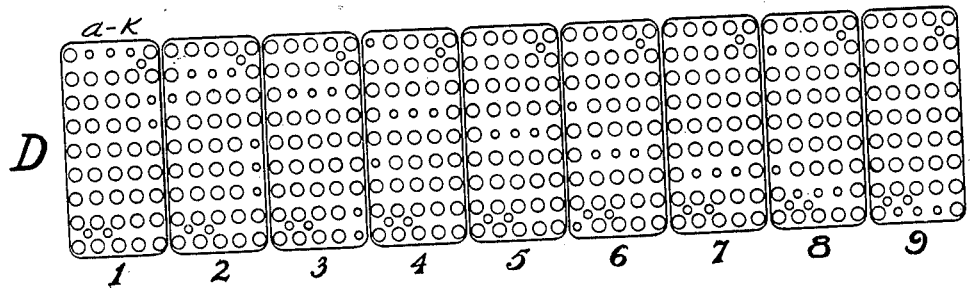
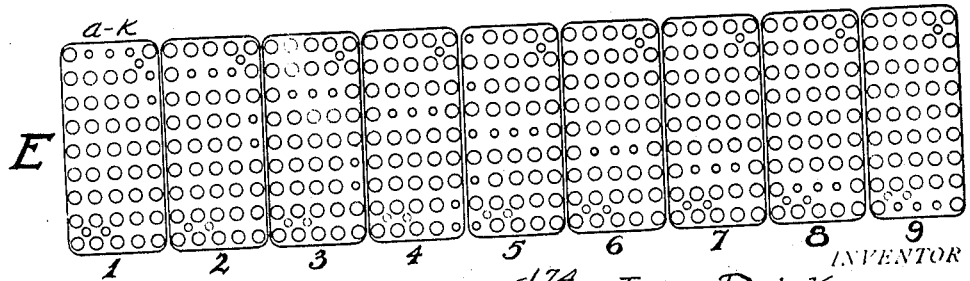
Fig. 19

July 31, 1934.  1,968,123
J. BRICKEN, NOW BY JUDICIAL CHANGE OF NAME J. G. BEAVER
CALCULATING MACHINE
Filed Feb. 28, 1931   17 Sheets-Sheet 14
Fig. 18A
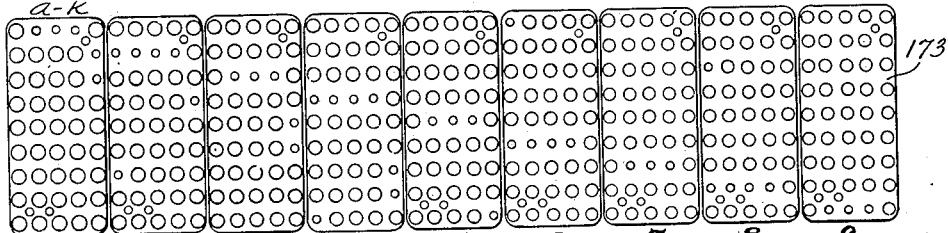
F
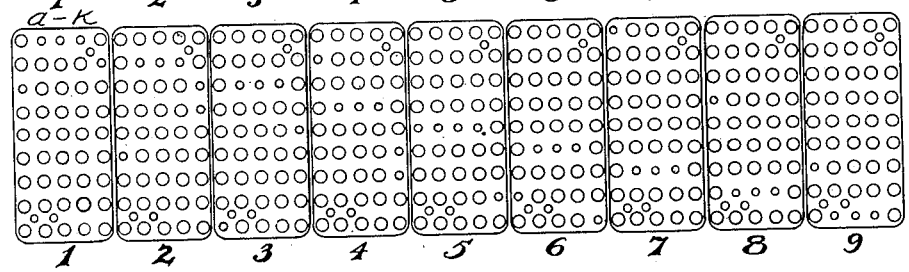
G
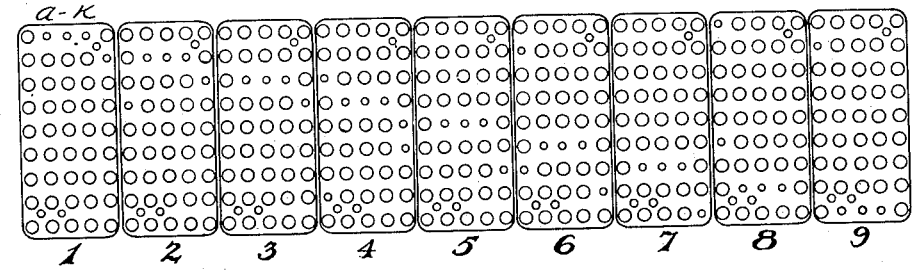
H
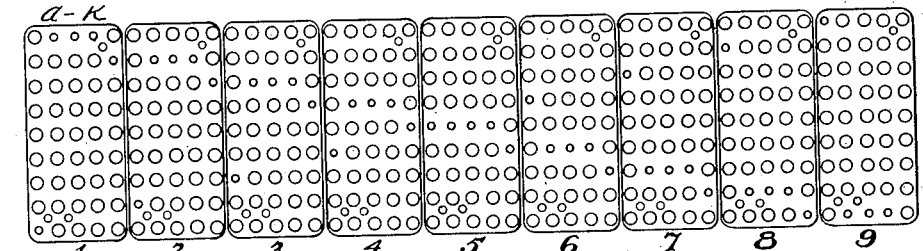
I
| I | H | G | F | E | D | C | B |
|---|---|---|---|---|---|---|---|
| 91110 | 81110 | 71110 | 61110 | 51110 | 41110 | 31110 | 21110 |
| 82221 | 62221 | 42221 | 22221 | 02221 | 82220 | 62220 | 42220 |
| 73332 | 43332 | 13332 | 83331 | 53331 | 23331 | 93330 | 63330 |
| 64443 | 24443 | 84442 | 44442 | 04442 | 64441 | 24441 | 84440 |
| 55554 | 05554 | 55553 | 05553 | 55552 | 05552 | 55551 | 05551 |
| 46665 | 86664 | 26664 | 66663 | 06663 | 46662 | 86661 | 26661 |
| 37776 | 67775 | 97774 | 27774 | 57773 | 87772 | 17772 | 47771 |
| 28887 | 48886 | 68885 | 88884 | 08884 | 28883 | 48882 | 68881 |
| 19998 | 29997 | 39996 | 49995 | 59994 | 69993 | 79992 | 89991 |
Fig. 20
INVENTOR
John Bricken
BY
Stuart Hilder
ATTORNEY

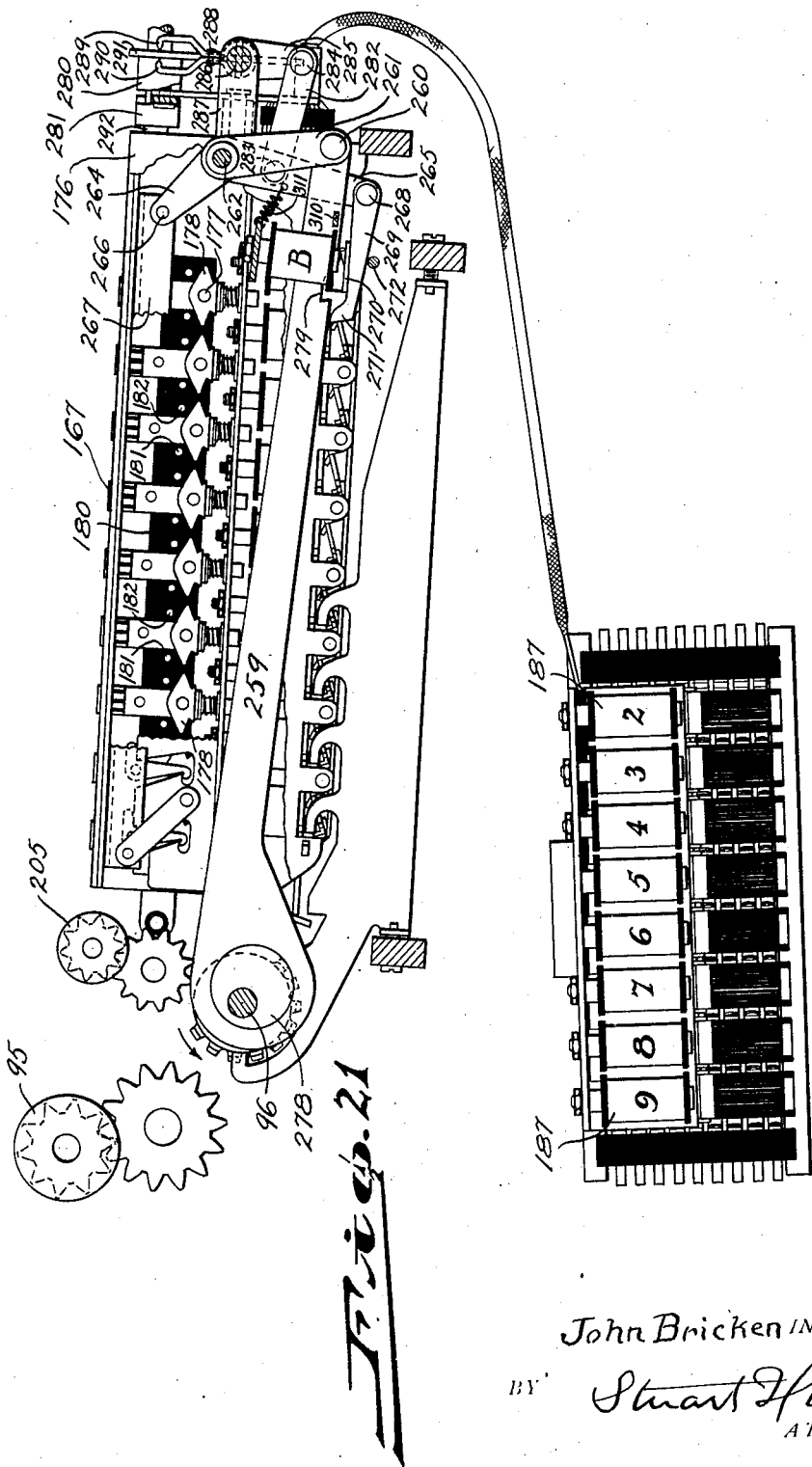

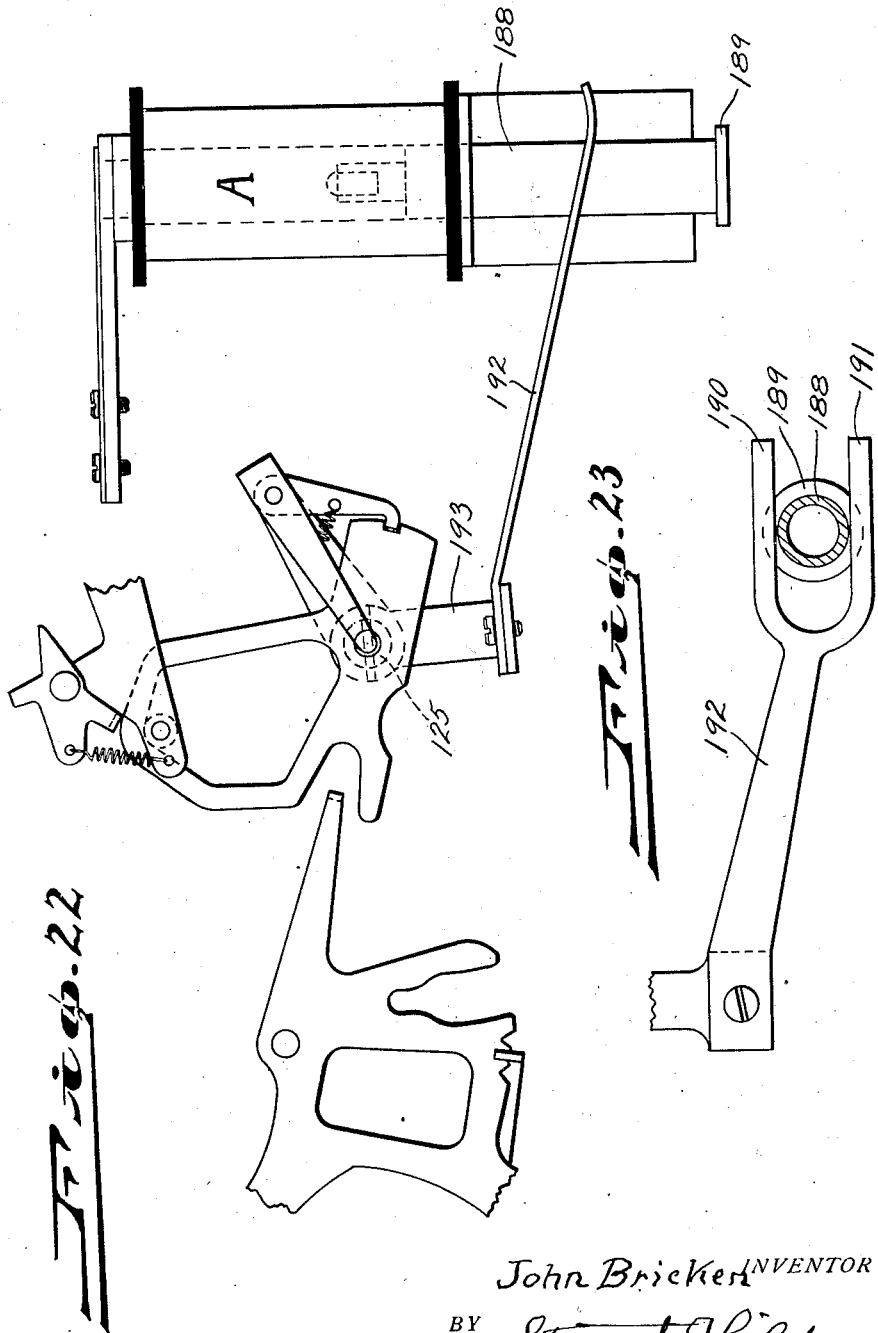

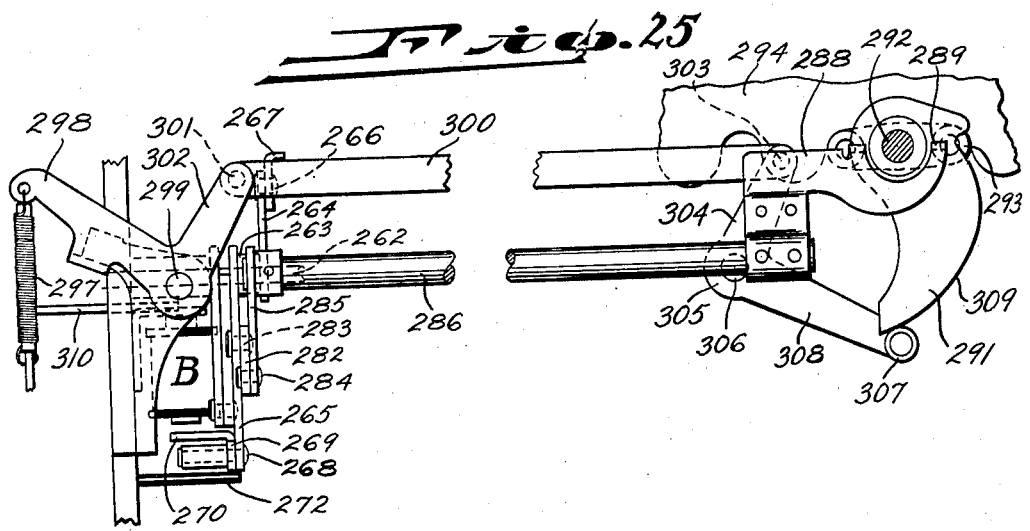
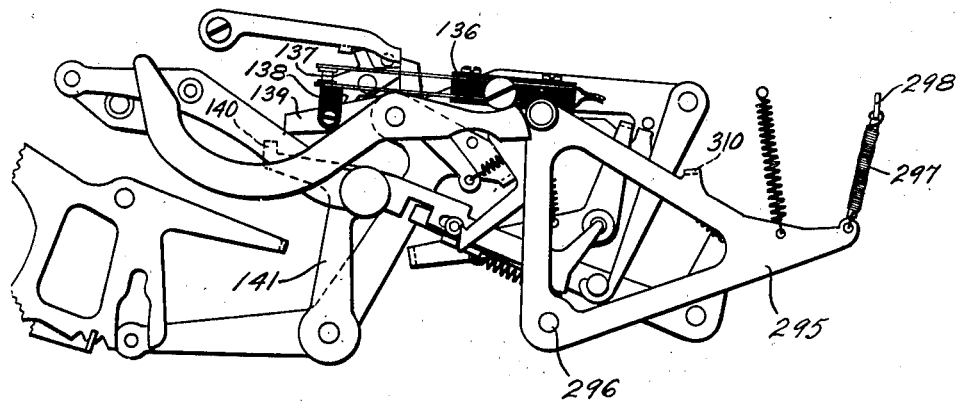

Patented July 31, 1934

1,968,123

UNITED STATES PATENT OFFICE 1,968,123

CALCULATING MACHINE

John Bricken, East Orange, N. J., now by judicial change of name John George Beaver, assignor to Monroe Calculating Machine Company, Orange, N. J., a corporation of Delaware Application February 28, 1931, Serial No. 518,935

6 Claims. (Cl. 235—79)

This invention relates to a calculating machine whereby computations are effected through an electrical circuit.

The object of the invention is to provide electrical computing means controlling differential setting mechanism, in a comparatively simple manner.

The invention consists in the novel construction and combination of parts as set forth in the appended claims.

In the accompanying drawings:

Fig. 1 is a diagrammatic plan view of a machine embodying the invention.

Fig. 2 is a diagram illustrating the circuit connections of the machine, with the order of differential setting magnets reversed for simplicity of showing.

Fig. 3 is a sectional right side elevation of a keyboard unit, taken substantially on line 3—3 of Fig. 1.

Fig. 4 is a detail elevation, showing a bail restoring lever and a bail stop latch.

Fig. 5 is a view similar to Fig. 3, with certain parts removed.

Fig. 6 is a sectional plan view of a keyboard unit, taken substantially on line 6—6 of Fig. 5.

Fig. 7 is a view similar to Fig. 6, with slide plate member removed, showing the bail spacing latches.

Fig. 8 is a right side elevation of the machine embodying the invention, with the right hand side frame broken away.

Fig. 9 is a front elevation of a keyboard unit.

Fig. 10 is a sectional plan view, taken substantially on line 10—10 of Fig. 8.

Fig. 11 is a left hand elevation of the parts just inside the left hand side frame of the machine.

Fig. 12 is a rear elevation, showing the switchboard and operating parts in normal position.

Fig. 13 is a view similar to Fig. 12, showing the switchboard and operating parts in the position assumed just after completing the shifting of a switchboard panel one step.

Fig. 14 is a view similar to Figs. 12 and 13, showing the position assumed by parts just after the completion of a second step movement of a switchboard panel.

Fig. 15 is a rear elevation of a slidable switchboard panel.

Fig. 16 is a partially diagrammatic elevation of the reverse side of a slidable switchboard panel (with pins and ends reversed for comparison with Fig. 15).

Fig. 17 is an enlarged plan view of the switchboard.

Figs. 18 and 18A are views of the circuit controlling plates of the switchboard panels.

Fig. 19 is a detail view of the insulating strips separating the circuit controlling plates of the switchboard panels.

Fig. 20 shows the table of multiplication in which the circuit controlling plates of the switchboard panels are arranged.

Fig. 21 is a left hand elevation of the multiplier unit and the carriage shifting clutch control members.

Fig. 22 is an elevation of parts controlling the drive clutch member.

Fig. 23 is a detail plan view of certain parts shown in Fig. 22.

Fig. 24 is a left hand side elevation showing parts of the carriage shifting mechanism.

Fig. 25 is a front elevation of certain parts used in the carriage shift.

In these drawings the invention is shown as applied to a calculating machine constructed in accordance with the disclosure set forth in Patent No. 1,566,650 issued to George C. Chase, December 22, 1925, as modified by the Chase Patents No. 1,664,661 issued, April 3, 1928 and No. 1,773,025, issued August 12, 1930. Reference is also made to Patent No. 1,157,079 issued to John Bricken, October 19, 1915 and the Reissue Patent No. 16,207 to Edgar E. Phinney dated November 10, 1925.

In the accompanying drawings and patents above referred to, the invention is shown as applied to a calculating machine of the well known "Baldwin" type, it is however not limited to this class, but is applicable to various other types, such, for instance, as the equally well known "Thomas" type calculators.

*The keyboard and associated mechanism (Figs. 1, 2, 3, 5, 6 and 8)*

As shown in Fig. 1 each denomination of the keyboard comprises a separate unit and each unit is adapted to be removed individually from the machine by removing a common locking bar 11 (Figs. 1, 3 and 5) suitably fastened to the framing of the machine.

Each unit or order of digits is provided with a row of digit keys 12 numbered on their faces from 0 to 9 inclusive. Each key, with the exception of the zero key, is normally held in partially depressed position (Figs. 3 and 5) against the tension of springs 13, by means of pawl members 14, pivotally mounted upon the keystems at 15 and having their free ends formed as a hook 16, said hooks having engagement with projections 17 formed by suitable openings cut in a plate member 18, fast to the frame of the unit.

A slight depression of a key 12 will cause a projection 19 of pawl 14, fast to said key, to engage with the surface 20 of plate 18 and cause said pawl to be pivoted about point 15 to bring hook end 16 out of engagement with the projection 17 of plate 18.

As shown in Fig. 8, the keyboard is set to slope forward at an angle to the base of the machine, so that upon release of a depressed key, hook end 16 of pawl 14 will remain clear of projection 17, by the action of gravity, and will allow said key to rise under the influence of its spring 13 until stopped by means of a cross-tree extension 21 of said key (insulated from the keystem at 22) coming in contact with the pins 23 and 24 mounted upon an insulated strip 25, as shown in Fig. 5.

As diagrammatically shown in Fig. 2, the pins 23 are connected to a common lead line 26 grounded in the machine, to thus establish a negative circuit line, while the pins 24 have leads 1, 2, 3 etc., hereinafter termed "digit" lines, extending to a set of multiplying switchboard panels, the digit line 1 corresponding to the digit key 1, the digit line 2 corresponding to the digit key 2, etc., to 9 digits.

When a digit key is in raised position, as illustrated by the number 8 key in the diagram, the bridging of pins 23 and 24 by cross-tree member 21, as previously explained, will continue the ground or negative circuit of lead 26 through pin 23, cross-tree member 21, pin 24 and, in this instance, digit line 8, to the multiplying switchboard, whence as diagrammatically illustrated, the circuit will continue unaltered through said switchboard by means of contact pins 28, wipers 29 and the number 8 plates in sections $a$ (if the depressed is in the units order, in sections $b$ if in the tens order, etc.) of the multiplying switchboard panels B. C. D. etc. to the result line 8$^a$, there being a plate 1, 2, 3 etc., in each switchboard for each digit key and a section $a$, $b$, $c$, etc., for each order provided in the machine, as fully described later.

The term "result" line is conveniently used to designate circuit lines leading from the switchboard to the differential setting magnets, and representing the result of a computation. As shown in Fig. 2, the result line 1$^a$ carries the circuit to the negative pole of the number 1 differential setting magnet, result line 2$^a$ carries the circuit to the number 2 setting magnet, etc. The result line 8$^a$ therefore will carry the circuit to the number 8 differential setting magnet, there being a differential setting magnet for each digit key of each order.

In like manner, any key of any order, to the capacity provided in the machine, is adapted to carry the negative or ground circuit to the negative pole of its corresponding differential setting magnet in the corresponding denominational order.

The positive pole of each differential setting magnet of each order terminates in a common lead 30 extending to a switch member 31 said switch member, being controlled by a cam 32 (Figs. 2 and 10) adapted to close the positive circuit from the service line 33 to the differential setting magnets during a certain portion of the cycle of operation, of the machine to be subsequently described.

*In addition*

The value eight having been inserted in the keyboard, and the negative circuit extended to the corresponding number 8 selecting magnet as previously described, the plus bar 120 (Fig. 8) is depressed to start an additive cycle of operation as clearly described in the aforementioned Chase Patents No. 1,566,650 and 1,664,661.

As diagrammatically illustrated and clearly described in the above Patent No. 1,566,650 the polyphase reversible cycle machine therein illustrated is characterized by an idle phase preceding an ordinal registration phase. In the present machine, it is desirable to use this idle phase for the shifting of the switchboards and setting of differential setting means, as will be described.

Fast to the carry shaft 154 (Fig. 8) and eccentrically mounted thereon, is a gear 34 meshing with a gear 35 fast to, and eccentrically mounted upon, a shaft 36 (Figs. 8 and 10) extending transversely of the machine and suitably supported in the left and right hand side frames 37 and 38.

In addition, gear 34 rotates in a clockwise direction, as viewed in Fig. 8, and will thus cause gear 35 and shaft 36 to be rotated in a counter-clockwise direction. The cam 32, (Figs. 2 and 10) is fast to said shaft 36 and will rotate therewith to release the switch member 31, the insulated block 39 fast to said member escaping from the surface 40 of said cam, and permitting contact of points 41 and 42, whereupon the number 8 differential setting magnet will become energized.

As shown in Figs. 3, 5, 6 and 7 there are pivotally mounted at 43, in the framing of the keyboard unit, the differential selecting pawl members 44, there being a selecting pawl 44 directly beneath each differential selecting magnet provided in the machine.

The selecting pawls 44 are provided with laterally projecting arms or lugs 45 and 46 as shown in Fig. 7. The arms 45 vary in length and are adapted to engage when in raised position with corresponding teeth 47 of the seven tooth bail 49 of one of a pair of swinging bail members 48 and 49, while the arms 46 are of uniform length and are adapted to contact with corresponding teeth 50 of the bail 48 having four teeth.

The bails 48 and 49 are pivotally mounted at 51 and 52 upon transversely extending support members 53 and 54, and are held apart, against the tension of springs 55 (Fig. 12), by means of cam blocks 56 and 57, fast to said bails, contacting with lugs 58 and 59 of a series of rocking levers 60, mounted upon a shaft 61, suitably supported in the framing of the machine at 62 and 63. There is a rocking lever 60 for each pair of bails and adapted to release said bails in the following manner.

The shaft 36 has fast thereon a cam member 64 (Figs. 8, 10 and 11) located near the left hand side frame of the machine, and a corresponding cam member 65 located near the right hand side frame. The cam members 64 and 65 are adapted to engage with rollers 66 and 67 supported upon the levers 68 and 69 loosely mounted upon a common shaft 70 supported in the framing of the machine.

As shown in Fig. 11, lever 68 has pivotally mounted thereon at 71 one end of a connecting link 72 the other end of which is loosely mounted upon a rod 73 supported by arms 74, 75, and 76 fast to the shaft 61. Rod 73 (Figs. 3, 4 and 10) extends transversely of the machine passing through the levers 60 as shown, and has loosely mounted thereon at the right hand end a connecting link 77, (Fig. 8) corresponding to the link 72, said link being pivotally mounted at one end 78 to the lever 69.

Rollers 66 and 67 are adapted to follow their respective cams 64 and 65, under influence of springs 79 and 80, and will therefore, during a portion of the cycle of operation, fall from the peripheries 81 and 82 of cam members 64 and 65 to the smaller peripheries 83 and 84 of same, whereupon the springs 79 and 80 will rock the levers 68 and 69 about shaft 70; links 72 and 77 will rock arms 74, 75 and 76; the rod 73 carried by said arms will rock the levers 60 in the direction indicated by the arrow, and the lugs 58 and 59 will disengage from blocks 56 and 57, and bails 48 and 49 will thus be free to rock toward each other under the influence of their springs 55 (Fig. 12).

As shown in Figs. 3, 6 and 7 the four tooth bail member 48 is provided with arms 85 and 86, adapted by engagement with groove 88 to impart lateral movement to a five tooth actuating gear segment 87, slidably mounted upon shaft 96 and rotatable with said shaft by means of projections 97 having engagement with grooves 98. The seven tooth bail member 49 is provided with similar arms 89 and 90 adapted, by engagement with the groove 92 to impart lateral movement to a four tooth actuating gear segment 91, also mounted upon the shaft 96 and adapted to turn therewith.

The five teeth of gear segment 87 are of uniform length while the four teeth of gear segment 91 are of varying length, the two segments co-operating, being adapted to impart a movement of from one to nine teeth to an intermediate gear 93, meshing with a dial gear member 94, fast to the dial 95, as will be more fully described later.

The bail 49 is adapted to move the gear segment 91 laterally four distinct steps toward the plane of the intermediate gear 93. The first step will bring one tooth of said gear segment into the plane of the intermediate gear member 93 the second step two teeth, the third three teeth and the fourth step the four teeth of said segment.

The bail 48 is adapted to move the gear segment 87 but one step and said segment will, when so moved, bring all five teeth of same into the plane of the intermediate gear 93. Thus the four tooth segment, when rotated, is adapted to rotate dial 95, through gears 93 and 94, from 1 to four steps, corresponding to the digits 1 to 4 and the gear segment 87 is adapted to rotate dial 95 five steps, corresponding to the digit 5, and the two segments cooperating will rotate dial 95 from six to nine steps, corresponding to the digits 6 to 9.

The movement of the bails 48 and 49 and of gear segments 87 and 91 will be limited, as will hereinafter be described, by the particular selecting pawl member 44 attracted by its differential setting magnet.

As shown in Figs. 3 and 5, the arms 45 and 46 of the differential selecting pawls 44 normally are positioned out of the path of movement of the teeth 47 and 50 of the bails 49 and 48. When however, as previously described, a differential setting magnet becomes energized the corresponding selecting pawl member 44 will be attracted by said magnet and will pivot about point 43, to bring the arms 45 and 46 of said pawl into the path of movement of the corresponding teeth 47 and 50 of bails 48 and 49, to thus limit the movement of said bails and provide for a setting of the gear segments 87 and 91 to a value corresponding to the digit key operated as will now be described.

As previously mentioned, the arms 46 of the selecting pawls 44 are of uniform length, while the arms 45 of said pawls vary in length. The pawls 44 therefore are adapted to control the setting of the gear segments 87 and 91 in the following manner.

The arms 46 of the pawls 44 corresponding to the numbers 1, 2, 3 and 4 differential setting magnets will, if any of said pawls be attracted, prevent the bail 48 from rocking, by contacting with the teeth 50 of said bail, and the gear segment 87 will remain out of the plane of the intermediate gear 93. The bail 49, as previously described, has a full movement of four units or steps, while the arm 45 of the pawl 44 corresponding to the number 1 differential setting magnet is three units in length, bail 49 therefore will move one step if the pawl for the number 1 magnet is attracted; the arm 45 of the pawl 44 corresponding to the number 2 magnet is two units in length and will therefore, if attracted allow bail 49 to move two steps; the arm 45 of the pawl 44 corresponding to the number 3 magnet is one unit in length and will therefore allow bail 49 to move three steps, while the pawl 44 corresponding to the number 4 magnet, having no arms, and therefore no corresponding tooth on bail 49, will allow said bail to move its full distance or four steps to thus provide for the registration of values from 1 to 4. The pawls 44 corresponding to the differential setting magnets 5, 6, 7, 8 and 9 have no arms 46, there being no corresponding teeth on bail 48, and bail 48 will therefore rock its full movement of one step to bring the five teeth of gear segment 87 into the plane of the intermediate gear 93 as previously described. The arm 45 of the pawl 44 corresponding to the number 5 setting magnet is four units in length and will therefore prevent any movement of bail 49; the arm 45 of the pawl 44 corresponding to the number 6 magnet is three units in length and will allow bail 49 to move one step etc., similar to the movements just described, to add 1, 2, 3 or 4 teeth of gear segment 91 to the five teeth of segment 87, to thus provide for the registration of values from 5 to 9 upon registering dial members 95 fast to the gear 94.

In like manner values are added or accumulated upon said dials, carrying means being provided similar to the means described in the aforementioned Chase patents.

The following means are provided to prevent movement of bails 48 and 49 in any order wherein no differential setting magnet has been energized and for restoring to normal position at each revolution of the machine any differential selecting pawl member 44 attracted to its differential setting magnet.

The levers 60 have each a finger 122 extending upward through one of a series of openings 123, as viewed in Figs. 3, 5, and 6, provided in a slide member 124, located over the differential selecting pawl members 44, there being a slide 124 for each order. The fingers 122 are adapted to prevent the forward movement of slides 124, under the influence of springs 200 exerted through latch members 126.

The forward rocking movement of the levers 60, as previously described, will cause the fingers 122 to release slides 124, and springs 200 through latch members 126 will move said slides forwardly a sufficient distance, if no pawl 44 is attracted to its magnet, to bring the shoulders 127 and 128 (Fig. 4) of latches 126 into the path of movement of the teeth 129 and 130 of bail members 48 and 49, to prevent movement of said bails, and the teeth of gear segments 87 and 91 therefore remaining out of plane with intermediate gear 93, no value will be registered on dial 95 upon the subsequent cycle of operation.

The differential selecting pawl members 44 are provided with projections 131 and will, if attracted by a differential setting magnet bring said projection upward into the opening 123, of slide 124, corresponding to said pawl, and the surface 132 (Fig. 6) of openings 123 will contact with projections 131 to prevent further movement of slide member 124 so that latches 126 will remain clear of teeth 129 and 130 of their respective bail members 48 and 49.

As shown in Figs. 3 and 5, the differential selecting pawl members 44 are also provided each with a projection 133, bent upward from the surface thereof. When a pawl member 44 is attracted to its magnet, projection 133 will contact with surface 134 of slide 124 and, as slide 124 rides forwardly as previously described, said pawl, will raise projection 133 into the opening 123 of said slide member.

Immediately following the ordinal registration phase of the cycle of operation, the cam members 64 and 65 (Figs. 8 and 11), through means previously described, will return the levers 60 to normal position, and the fingers 122 of said levers, by engagement with the surface 132 of slide member 124, will slide same rearwardly, and projections 133 of pawls 44 will cam said pawls downwardly about point 43, away from the differential setting magnets, until stopped by projections 135 of a metal strip, suitably mounted upon the pivot shafts 43 as shown in Fig. 3. The cam member 32 (Fig. 2) will have meanwhile broken the positive circuit, at 41 and 42 to the differential setting magnets.

As described in the above-mentioned Patent No. 1,566,650, the machine is adapted to overrun the full cycle position when it is brought to rest, means being provided as described for returning the parts to such full cycle position.

To prevent any differential setting magnet from becoming energized during this overrun, a switch member 136 (Figs. 2 and 24) is inserted in the main service line 33, said switch member normally having its contact points 137 held together by means of an insulated block 138 mounted upon an arm of stop element 139. When a tripping of the full cycle stopping means takes place, as described in the above patent, element 139 in falling to a position to engage with end 140 of rock lever 141 will break the contact points 137 of switch 136, and the main service line thus being broken, the differential selecting magnets will not be energized.

Cam members 64 and 65 (Figs. 8 and 11) have a slight rise 142, centrally located upon the cam surfaces 81 and 82 of said cams said rise providing the cam surfaces 143 and 144 adapted, in the following manner, to check rebound of the parts as they come to rest.

When the plus bar 120 (Fig. 8) is depressed the bottom surface of its keystem 145 will contact with a stud 146 fast to one arm 147 of a rocking member 148 pivotally mounted on the framing of the machine at 149, and will rock said member in a counter-clockwise direction. Point 150 of said member camming over a spring roller 151, suitably mounted to the framing of the machine, will cause said roller, acting on cam face 152, to impart further movement to the rocking member 148 to bring the hook end 153 of a similar arm 155 of member 148 into the path of movement of a pin 156, fast to the outside face, near the outer periphery, of a gear 157 meshing with a similar gear 158 having engagement with driving gear 159 mounted fast to the drive shaft 154. Gears 157, 158 and 159 are of one to one ratio and, as previously stated, the shaft 154 rotates, for addition, in a clockwise direction, therefore, gear 157 will also rotate in a clockwise direction for addition, and pin 156 will merely ride over hook end 153 of arm 155. The subsequent stop and return of parts however, as described in Patent Number 1,664,661 will rotate the gear 148 in a counter-clockwise direction, whereupon pin 156 will engage hook end 153 of arm 155 to stop further movement of parts at exact full cycle position, and rollers 66 and 67 of arms 68 and 69 will come to rest against the surface 143 of cam members 64 and 65 and will, due to pressure exerted thereon by the springs 79 and 80, prevent any rebound of the parts that might occur due to pin 156 on gear 157 striking hook end 153 of lever 148, upon return from the overrun.

*In subtraction*

The machine being of the reversible cycle type, depression of the minus bar 121 will cause the machine to perform a subtractive cycle of operation, as explained in the previously mentioned patents wherein the various parts will function as previously described, with the exception that gear segments 87 and 91 will rotate in the opposite or counter-clockwise direction, to subtract any values set up on same, in the manner described, from any value registered on the dial members 95.

The depression of minus bar 121 will cause its keystem 160, contacting with a stud 161 on arm 155 of lever 148, to rock said lever about point 149 and bring hook end 162 of the arm 147 of said lever into the path of movement of a pin 163 on gear 157, to bring the parts to rest in full cycle position in similar manner to that described for addition, and the rollers 66 and 67 will come to rest against the surface 144 of cam members 64 and 65 to prevent a rebound of the parts, as previously described.

*Keyboard clearing or resetting means (Figs. 3, 5, 8 and 9)*

Loosely mounted upon a shaft 99, extending transversely of the machine and suitably supported in the framing thereof, are the bell crank levers 100 there being a lever for each order of digits. One arm of said bell crank lever is pivotally connected to one end of a restoring bar 101 (Fig. 3), extending rearwardly of the machine and having its other end pivotally attached at 102 to a lever 103, there being a bar 101 for each order of digits. Lever 100 is provided with an arm 105 extending beneath a pin 106, fast to the keystem 107 of the zero keys. The zero keys are normally held in a raised position by their spring members 108 and the bars 101 are held by the springs 109 against a universal cross bar member 110 extending transversely of the machine and mounted fast to the right and left hand ends of the shaft 99.

Depression of the zero key will cause pin 106, by engagement with arm 105, to rock lever 100 clockwise about shaft 99, and bar 101 will be carried rearwardly and downwardly by the levers 100 and 102 to depress any digit key raised in the corresponding order, by means of a shoulder 111 (Figs. 3 and 9) of bar 101 engaging the projections 19 of pawls 14, fast to the digit keystems whereupon hook end 16 will reengage the projections 17 of plate 18 to hold the key in depressed position as previously described.

A universal clear key 112 is provided, to clear the entire keyboard in the following manner. Fast to the right hand end of shaft 99 is a lever 113 (Fig. 8) having its free end 114 extending through an opening in the keystem 115 of clear key 112. Depression of clear key 112 will therefore depress end 114 of lever 113 and rock shaft 99 in a clockwise direction. As previously described shaft 99 has fast thereto the universal cross-bar member 110 which will be caused to rock with said shaft and therefore rock the bars 101 of all orders, to restore any raised digit keys in the manner previously described.

Suitable repeat and non-repeat mechanism is provided, whereby a lever 116 is caused to be moved in and out of the path of movement of a cam 117, adapted to impart rocking motion to said lever upon the completion of one revolution of the machine, as fully described in Reissue Patent No. 16,207. Lever 116 is provided with a projection 118, overlying the end 114 of lever 113, and will when rocked, depress same to clear the keyboard in the manner previously described.

*Multiplying or factor switchboard*

Embodied in the machine, as shown in Fig. 8, and suitably supported in the framing thereof, by support members 164, 165 and the several members 166 (Figs. 10, 11; 12), is the multiplying or factor switchboard, adapted to change the incoming digit line values to product factor values as will hereinafter be described.

The factor switchboard comprises the two stationary or fixed panels A and J (Figs. 2, 10 and 17) extending transversely of the machine, and the eight intermediate panels B, C, D etc., adapted to be shifted laterally in the manner to be subsequently described. Each of these shiftable panels correspond to a factor key 167 (Figs. 1, 2, 21) of the keyboard, the panel B corresponding to the number two factor key, panel C to the number 3 factor key etc., there being no panel for the number 1 factor key for the reason to be explained later.

The stationary panel A comprises a block of insulating material 168, provided on its inner face with nine levels of conductor strips or wipers 29, each level representing a given digit number, the uppermost level representing the digit line 1 and the lower-most level the digit line 9. Each level is composed of a plurality of wipers 29, each wiper representing a given order or denomination of the particular digit represented by that level, for example, (Fig. 17) the wiper 29 at the right represents units, the next tens, etc. Each wiper 29 is connected to its corresponding digit line in the corresponding denomination by means of pins 169 electrically connected to said strips and having engagement with the corresponding pins 170 of the digit lead lines 1, 2, 3, etc. (Figs. 2, 8 and 10).

The shiftable factor panel B is composed of two vertical blocks of insulating material 171 and 172, extending transversely of the machine and having mounted therebetween nine superimposed levels of conductor plates 173 (Figs. 2, 17, 18 and 18A). Each level of plates 173 is divided into a plurality of sections a, b, c etc., there being a section for each order or denomination provided in the machine, that is, (Figs. 2, 15, 16, and 17) section a is of units order, section b of tens order etc. Each of these plates 173 extends vertically from the top to the bottom of the switch panel and is mounted between insulating blocks 174 (Figs. 17 and 19). On the face of the switch panel block 171 are nine levels of pins 28 (Figs. 16 and 17), (the pins and ends of Fig. 16 being reversed as per description of figures). In the space a alloted to the units denomination there are five pins in each level, the three center pins being connected to the plate corresponding to that level. For example, the three center pins in the first level are connected to the first plate, the three center pins in the second level to the second plate, etc., as shown by the smaller diameter holes of Figs. 18 and 18A, in which B, C, D, etc. represents the switchboard panel, a—k the denominations in each switchboard panel and the numerals 1, 2, 3, etc., the superimposed level of plates 173.

The pins 28 are connected through the smaller diameter holes to plates 173, and will extend through the larger diameter holes of said plates without contacting with the plates, for which they are not intended.

It may be noted of Figs. 18 and 18A that the small circles in the plates located between the five lines of holes above-mentioned are rivet holes, and have no relation to the pins 28.

The left and right hand pins of the group of five are arranged according to a table of the product of two factors (Fig. 20), the left hand pin being for the units value of the product and the right hand pin being for the tens value of the product i. e. in multiplying 8 x 7 the product would be 56 units or 6 units and 5 tens. The left hand column would take care of the 6 units and the right hand column would take care of the 5 tens, as will hereinafter be described. The pins 28 of sections b, c, d etc., are connected to the plates 173 of the corresponding sections in the same manner as in section a.

On the face of the switch panel block 172 are the wipers 29 (Fig. 17), fast to the right hand pin of the three center pins 28 and normally adapted to carry the circuit to the next switchboard panel C by contacting with the left hand pin of the three center pins in the corresponding sections, there being nine levels of said wipers, corresponding to the nine levels of pins 28, and a wiper for each section or order a, b, c, etc.

The panels C, D, E, F, G, H and I are of similar construction and differ only as to the connections, to plate 173, of the left and right hand columns of pins 28, said pins of course, differing with each digit factor according to the table shown in Fig. 20.

There is no tens column provided for the product of two factors in the highest order of the machine, therefore the highest denomination will not be adapted for multiplication, and the units column of said order for each panel, will have no electrical connections with the plates 173, as indicated by the blank pins in Figs. 2 and 16 (Note: The pins 175 shown at the extreme right of Figs. 15 and 16 are not circuit pins, and are used merely to assist in binding the panels together).

Means for selecting the multiplying or factor switchboard panel to be shifted (Figs. 1, 2 and 21)

A multiplying unit 176, containing the factor keys 167, is located at the left hand end of the keyboard as shown in Fig. 1.

As shown in Figs. 2 and 21 the factor keys 167 have mounted thereon and electrically connected therewith at 177 the cross-tree members 178.

The factor keys 167 are held in depressed position and will be allowed to rise when freed, in the same manner as described for the digit keys of the keyboard.

The keystems of the factor keys 167 are grounded, as shown in Fig. 2, by means of the common metal plate member 179.

Supported in an insulating block member 180 (Fig. 21) are contact pins 181 and 182. The pins 181 are connected to a common lead member 183 (Fig. 2) extending to the negative pole of a solenoid A. The pins 182 are connected, through leads 184, to the negative poles of corresponding factor differential setting magnets, there being a setting magnet for each factor digit key 167.

The negative pole 182 corresponding to the digit one factor key is connected also, through lead 185, to the negative pole of a magnet B. The negative poles 182 corresponding to the factor digits from 2 to 9 inclusive are connected through leads 184 and 186 to the negative poles of corresponding switchboard selecting magnets 187, there being a selecting magnet for each panel B, C, D, etc. of the switchboard.

When any factor key from 2 to 9 is raised, the cross-tree member 178 fast to said key will contact with its corresponding pins 181 and 182 and thereby continue the ground or negative circuit from plate 179, through said key, its cross-tree member 178, pin 181 and the lead line 184, to its corresponding factor differential setting magnet, and also through lead 186 to the corresponding factor switchboard panel selecting magnet 187.

The digit one factor key, if raised, will continue the ground circuit from plate 179 through, said key, its cross-tree member 178, pin 181 and lead 183, to the solenoid A; and from pin 182 through lead 184, to its corresponding factor differential setting magnet and also through lead 185 to the negative pole of magnet B.

There being no switchboard panel for the number one factor key, there will be no selecting magnet for said key.

As shown in Fig. 2 the positive pole of solenoid A is directly connected to the main service line 33 and will therefore become energized upon the closing of its negative circuit, by the rising of a factor key as just described, and will attract its plunger 188. (Figs. 22 and 23). Plunger 188 will rise and a shoulder 189 on said plunger will strike the bifurcations 190 and 191 of an extending arm 192, fast to a member 193 keyed to the rock shaft 125, and thereby cause said shaft 125 to be rocked in the same direction as by the plus bar 120, whereupon the machine will start a cycle of operation as described for said plus bar in Chase Patent No. 1,566,650.

The factor differential setting magnets, from 1 to 9 inclusive, have their positive poles connected to a common lead line 312 extending to a switch member 313 (Figs. 2 and 10), normally having its contact points 314 and 315 held open by means of a cam 316, mounted fast upon the shaft 36, contacting with an insulated block 317 fast to one arm of switch 313.

The switchboard selecting magnets 187, from 2 to 9 inclusive, have their positive poles connected by a common lead line 194 to a switch member 195, normally having its contact points 201 and 202 held in disengaged position by means of a cam 203, also fast to the shaft 36, and engaging the insulated block 204, fast to one arm of switch member 195. Immediately after the initiation of a cycle of operation, in the manner just described, the cam 203, rotating with shaft 36, will free the block 204 and thus allow the points 201 and 202 of switch 195 to contact and continue the positive circuit, through lead 194 to the switchboard selecting magnets 187, and cam member 316, also rotating with shaft 36 will free the block 317 and allow the points 314 and 315 of switch 313 to contact and continue the positive circuit, through lead 312 to the factor differential setting magnets. The particular factor key raised having closed the negative circuit, as described, the differential setting magnet and the switchboard selecting magnet corresponding to said key will become energized.

The digit value of a factor key will, upon the energizing of its corresponding differential setting magnet, be registered upon dial members 205 (Figs. 1 and 21) in the same manner as that disclosed for registering the digit values of keys 12 upon the dials 95.

The differential actuator gears which register upon dials 205 are mounted upon the shaft 96 of the main actuators, but, being of smaller diameter than the latter, do not interfere with the gearing of register wheels 95.

There is, of course, no carrying means necessary for the dials 205, said dials merely showing the digit values of the successive factor keys operated, that said values may be checked if desired.

Clearing means for dials 205 are also provided similar to the means used for clearing the dials 95, as described in the aforementioned patent.

The energizing, as just described, of a switchboard selecting magnet 187 will cause said magnet to attract its corresponding armature 206 (Figs. 12, 13, 14, 15, 16 and 17) pivotally mounted by pins 225 to its corresponding factor panel, that is, if the number 7 factor key were raised the number 7 selecting magnet would be energized and the armature 206 of the panel G corresponding to said magnet, (Figs. 2 and 16) would be attracted and surface 207 of said armature would be brought into the path of movement of surface 208 of a member 209 extending across the several panels A, B, C, etc. of the switchboard, as shown in Figs. 11 and 17 and adapted therefore to engage with any armature 206 attracted, there being an armature 206 fast to each panel of the switchboard. The member 209 is adapted to shift any panel of the switchboard by the following means.

Means for shifting the factor panels of the switchboard (Figs. 10, 11, 12, 13, 14)

As shown in Fig. 10, the shaft 36 has mounted thereon, near the left hand end, the bevel gear 210, keyed to said shaft by the pin 211 and having engagement with a corresponding bevel gear 212 keyed by means of pin 213 to a shaft 214 extending longitudinally of the machine and having bearings in the brackets 215 and 216.

Mounted on the rear of shaft 214 and adapted to rotate with said shaft is a cam 217, adapted to contact with a roller 218 mounted upon an arm 219 of an oscillating member 220 pivotally supported at 221. Mounted upon an arm 222 of said oscillating member is a roller 223 adapted to engage with a cam 224, also mounted upon, and keyed to, the shaft 214.

There is a mechanism of similar construction provided on the forward end of shaft 214, adapted to operate in the same manner and in unison with the mechanism just described.

As shown in Fig. 12, in normal position of the parts, the lower surface 226 of cam 217 will be opposite roller 218 on arm 219, while the highest surface 227 of cam 224 will be opposite the roller 223 on arm 222.

When shaft 214 is caused to rotate, as just described, the cams 217 and 224 will rotate in unison therewith and cam 224 will free roller 223, while cam 217, acting on roller 218, will rock oscillating member 220 in a counter-clockwise direction as viewed in Figs. 12, 13 and 14.

At the completion of one revolution of the machine the surface 227 of cam 224 will have reengaged roller 223 and returned member 220 to its original position, the roller 218 being carried to the lower surface 226 of cam 217 in harmony with the return movement of member 220.

The member 209, just described, is supported at 228 upon the oscillating members 220, as shown in Figs. 11, 12, 13 and 14, and is adapted therefore to rock with said members so that the surface 208 of member 209 (Figs. 15 and 16) contacting with any raised pawl 206 as previously described, will shift the corresponding factor panel one step, as shown in Fig. 13.

By a study of Fig. 17 and comparison of Figs. 15 and 16, it can be seen that if a switch panel is moved one step, in the direction indicated by the arrows, the wipers 29 of the preceding panel will contact with the end pins 28 corresponding to the units value of the product of two factors, as previously described, and the wipers 29, fast to the panel shifted, will engage with the center pins 28, of the groups of three pins previously described, of the following panel. The units value of the product of two factors will continue through said pins, in the proper level, to their corresponding wipers 29 and so on through the remaining panels to the result line, as previously described and to be more fully described later.

As shown in Figs. 2, 10, 12, 13 and 14, one end of the switchboard panels is adapted to contact with a rod 229 extending across the several panels of the switchboard and supported at each end by the similar arms 230, pivotally mounted at 231 upon suitable support means.

Loosely mounted one on each end of rod 229, are the levers 232 and 233, of similar construction and having their free ends 234 linked together by means of a tie-rod 235.

The levers 232 and 233 are adapted to operate as one by corresponding similar means, and it will be necessary therefore to describe only the means and operation of lever 232, it being understood that the lever 233 will cooperate in like manner.

The free end 234 of lever 232 in normal position (Fig. 12) will be supported by the end 236 of a lever 237 pivotally mounted at 238 to bracket 250. The tie rod member 235 will support one end 239 of a lever 240, pivotally mounted at 241 upon the projection 242 of support member 166.

The movement of a switchboard panel one step, as previously described, will cause said panel to rock the rod 229 and arm 230 to the position shown in Fig. 13, and the lever 232 will be moved a short distance in the direction indicated by the arrow, so that the tie rod 235 fast thereto will cam the end 239 of lever 240 upwardly a slight distance, against the tension of a spring member 243.

Pivotally mounted at 244 to the lever 240 is an arm 245 of a member 246 extending over the upper surface of the several pawl members 206, as shown in Fig. 17, and being similarly supported at its forward end. The slight upward movement of lever 240 therefore will have also raised said member 246 a slight distance.

The return movement, as previously described, of lever 220 will cause the surface 247 (Figs. 15 and 16) of member 209 to cam the pawl 206 downwardly, away from its magnet 187. Near the end of said return movement however the surface 247 of member 209 will free the pawl 206 and allow same, under the influence of its spring 248 (said spring member having stored energy by contacting with the projection 249 of bracket 250 during the first step movement of the switchboard panel) to return to the position against magnet 187 and thereby bring its surface 207 into the path of movement of the forward surface 251 of member 209.

The machine having now completed one revolution will start a second revolution, and the subsequent rocking of member 220 will now cause the forward surface 251 of member 209 to contact with the surface 207 of pawl 206 and thus advance the corresponding switchboard panel a second step, to the position shown in Fig. 14.

As previously explained the magnets 187 will be energized immediately after the start of a cycle of operation and, due to the inertia of the parts, member 209 will move more slowly at the start of a cycle of operation, and the space between the surface 208 of member 209, and surface 207, of pawl 206, will be sufficient to allow pawl 206 to be attracted to its magnet 187 before the engagement of surface 207 with surface 208 takes place. At the start of a second revolution of the machine however, the parts will have attained their highest velocity, and the equivalent space occurring between the surfaces 251 of member 209, and 207 of pawl 206, may not be sufficient for the magnet 187, under the normal 60 cycle circuits provided, to become energized in time to bring the surface 207 of pawl 206 into the path of movement of the surface 251 of the now rapidly moving member 209. Therefore the springs 248 are provided, to assure this engagement.

The shifting of the switchboard panel a second step will cause the wipers 29 of the preceding panel to engage with the pins 28, of the shifted panel, located in the next higher denominational section and corresponding to the tens value of the product of two factors (Figs. 15, 16 and 17), and the wipers 29, fast to said shifted panel, will engage the third pin of the group of three, to continue the new contact to the result lines, as previously described, and to be more fully described later.

The second movement of the switchboard panel will have also moved the lever 232 in the same manner as previously described, and the tie-rod 235 fast to said lever will raise the end 239 of lever 240 still higher, so that member 246, rising with the same, will be positioned above the raised level 252 of pawl 206, as shown in Fig. 14.

The second movement of lever 232 will have also disengaged its end 234 from the end 236 of lever 237, and said end 234 will drop to rest upon the support member 166, as shown in Fig. 14, and a lug 253 on end 234 of member 232 will be brought into the path of the return movement of arm 219 of member 220.

The dropping of end 234 of lever 232 upon the support member 166 will have also carried tie-rod 225 downwardly, and end 239 of lever 240 (shown in raised position in Fig. 14) will be free to rock downwardly under the influence of spring 243, and member 246 pivotally mounted thereon by means of arm 245, as previously explained, will be carried downwardly into contact with the raised level 252 of the attracted pawl 206 and will force said pawl downwardly, about point 225, away from its magnet 187 and free of the member 209.

An oscillating member 220 is again returned to normal position, by means of surface 227 of cam 224 contacting with roller 223 fast to said member, the arm 219 of said member will contact with the lowered lug 253 of member 232, to return said member, and cross-rod 229, contacting with the end of the switchboard panel, will return said panel to its normal position.

The end 234 of member 232 is now lifted to its normal position upon the end 236 of lever 237 in the following manner.

The return movement of lever 232, as just described, will have brought a roller 254 mounted thereon into the path of movement of cam surface 255 of the arm 219 of oscillating member 220, and it will be recalled that the machine is adapted to over-run the full cycle position a definite number of degrees as explained in Patent No. 1,566,650. This overrun will cause cam member 217 to again rock member 220 in the manner previously described, whereupon the surface 255 of arm 219 of said member will engage the roller 254 of lever 232 and cam the end 234 of said lever upwardly, to free the end 236 of lever 237, said lever having previously been rocked against the tension of its spring 256 by the return movement of lever 232. This end 236 of lever 237 will be brought by spring 256 to its normal position beneath the end 234 of lever 232.

The subsequent return of the parts to full cycle position will now return the member 220 to normal position, and the pin 156 (Fig. 8) of gear 157, contacting with end 153 of member 148, will bring all parts to rest in exact full cycle position as previously described.

The machine has now made two revolutions in response to any factor key from 2 to 9, which may have been operated.

To prevent the digit value of the operated factor key from becoming registered twice (once for each revolution) upon the dials 205, the following means are provided to prevent the factor differential setting magnets from becoming energized upon the start of the second revolution:

Fast to the rod 229 (Figs. 2, 12, 13, 14) is an insulated pin 257, normally in the position shown in Fig. 12.

When a switchboard panel is shifted one step, rod 229, and therefore pin 257, is rocked to the position shown in Fig. 13, as previously explained.

During a second revolution of the machine the cam 316 (Fig. 2) will again allow contacting of points 314 and 315, but the switchboard panel in shifting a second step will cause the pin 257 of rod 229 to contact with member 258 of switch 197 and break the contact points 198 and 199, as shown in Fig. 14, to thus prevent the factor differential setting magnets from becoming energized, and no registration will take place, for the same reason as that described for the denominations of the keyboard in which no digit key is operated.

The means for tripping the full cycle stopping means at the end of a second revolution, to thus bring the machine to rest, will now be described.

Eccentrically mounted upon the shaft 96 (Fig. 21) is a connecting link 259, having its other end pivotally mounted at 260 upon an arm 261, loosely mounted upon a shaft 262, supported at one end by the main framing of the machine and at the other end by the framing of the factor keys unit.

Fast to a common hub 263 (Fig. 25) mounted upon the shaft 262, are the levers 264 and 265. The lever 264 is pivotally connected at 266 to a factor key restoring bar 267, corresponding to the digit key restoring bar 101 previously described. The lever 265 has pivotally mounted thereon at 268 the pawl member 269, provided with a lug 270 extending beneath the magnet B, as shown in Figs. 21 and 25, the free end 271 of pawl 269 being positioned by a pin 272 fast to the framing of the machine.

At the start of the second revolution of the machine the switchboard panel was shifted a second step, and the insulated member 257 of rod 229 contacted with and rocked the member 258 of the switch 197. Fast to the member 258 of said switch is an insulated block 273, and said block will have contacted with a member 274 of switch 197 and rocked same to cause a contact of points 275 and 276, to close the negative circuit to the magnet B, as shown in Fig. 2. The positive pole of magnet B being connected directly, through lead 277, to the main service line 33, said magnet will have become energized.

The start of a second revolution of the machine will also cause eccentric 278 of shaft 96 to carry the link 259 rearwardly, pawl 279, under the influence of magnet B, engaging the indenture 279 of link 259 during said rearward movement. As eccentric 278, upon the further rotation of shaft 96 moves link 259 forwardly, pawl 279 will be moved forwardly and will rock the levers 264 and 265 in a counter-clockwise direction, and the key restoring bar 267, fast to lever 265, will restore the factor keys 167 in the same manner as described for restoring the digit keys of the keyboard.

The restoring of a raised factor key will of course break the circuit to solenoid A, by disengaging the cross-tree member 178 of said key from its corresponding pin 181, and the solenoid A will release its plunger 188 to thus, by freeing the shaft 125 (Figs. 8 and 22), allow the full cycle stopping means to operate, as when plus bar 120 is released, as described in Patents No. 1,566,650 and 1,664,661.

The counter-clockwise movement of lever 265 is adapted to engage the carriage shifting clutch members 280 and 281 (Fig. 21), preparatory to automatic shifting of the carriage, in the following manner.

A link 282 is pivoted at 283 to lever 265 and has its other end pivoted at 284 to an arm 285, fast to a shaft 286 suitably supported from the front framing of the machine by bracket 287 (Fig. 21). The counter-clockwise movement therefore of lever 265 will cause link 283 to rock arm 285, and consequently shaft 286 also, in a counter-clockwise direction. Fast to the right hand end of the shaft 286 is a shipper arm 288 (Figs. 21 and 25) having like arms 289 and 290 embracing a shifting cam 291, loosely supported by its clutch hub 280 upon a shaft 292, extending rearwardly of the machine and having the oppositely disposed crank arms 293, engaging the serrations of a rack 294 mounted upon the forward edge of the carriage. The rocking movement of shaft 286 will cause the arms 289 of shipper arm 288 to slide the shifting cam 291 rearwardly, to thus bring its clutch hub 280 into engagement with the clutch member 281 fast to the shaft 292.

Operation of the automatic carriage shifting means described in Patent No. 1,773,025, will cause the bell crank lever 295 (Fig. 24) of said means, to be rocked downwardly about point 296 and, through coupling member 297, rock the bell crank 298 counter-clockwise about point 299. A connecting link 300, pivotally mounted at 301 to arm 302 of bell crank lever 298 and at 303 to an arm 304 of a bell crank lever 305, will cause said lever 305 to be rocked counter-clockwise about point 306, so that a roller 307, fast to an arm 308 of bell crank 305, will contact with the surface 309 of cam 291 and rotate said cam in a clockwise direction, its clutch hub 280 engaging with clutch 281 serving to impart clockwise rotation to shaft 292 and thereby shift the carriage one step toward the right.

During the last portion of the downward movement of bell crank lever 295, an arm 310 of said lever will strike the pawl 269 and force said pawl downwardly to disengage its end 271 from indenture 279 of connecting link 259 and a spring 311 will return the lever 265 to its normal position. Link 282 will also rock shaft 286, through arm 285, in a clockwise direction, to cause arms 290 of shipper arm 288 to disengage the clutch members 280 and 281, by sliding the cam member 291 forwardly to its normal position.

To prevent an automatic shifting operation from taking place when the carriage is in the extreme right hand position, a switch member 320 (Fig. 1) is inserted in the main service line 33, having its contact points 321 and 322 in engaged position, as shown in Figs. 2 and 8. When the carriage is in the extreme right hand position, however, an insulated pin 323, fast to the forward edge of the carriage, will have come to rest upon one arm 324 of switch member 320 and forced said arm downwardly, to disengage the contact points 321 and 322. The main circuit line 33 being thus broken, no cycle of operation will occur upon the depression of a factor key 167.

The machine being adapted to perform division problems in the well known manner of repeated subtractions, a switch 325 is inserted, adapted to provide for subtractive operation of the machine, when the carriage is in the extreme right hand position. For this purpose a pin 326, fast to the minus bar keystem 160, engages, upon depression of said bar, an arm 327 of switch 325 to thereby contact the point 328 and 329 of said switch, thus closing the main circuit line 33 around switch 320, as shown by the diagram in Fig. 2.

As has been previously mentioned, there is no switchboard panel, and consequently no switchboard selecting magnet, for the number one factor key for the reason now to be explained.

It is, of course, well understood that the product of two digits, if one of said digits be 1, will have no tens order, the value being that of the larger digit. That is, if 7 were multiplied by 1 the product of these two factors would be 07. Therefore, if any digit values set up on the digit keys 12 of the keyboard are to be multiplied by the factor 1, it will be necessary for the machine to make but one revolution to register said value, in the manner described for addition, the carriage being then shifted one step, ready for the next higher order multiplying factor.

The following means are provided to limit the cycle of operation of the machine to one revolution upon operation of the number one factor key.

The operation of the number one factor key will energize solenoid A and also close the negative circuit to the number one differential selecting magnet, to set the means for registering the factor digit value 1 on the dials 205, upon the subsequent cycle of operation of the machine, in the manner previously described for the factor keys 2 to 9. However, the contacting of cross-tree member 178 of the number one factor key with its corresponding pin 182 will also, through lead 185, close the negative circuit to the magnet B and, as the positive pole of said magnet, is connected, through lead 277, directly to the main service line 33, said magnet will immediately become energized and pawl 269, being attracted to said magnet, will engage indenture 279 of link 259 during the first revolution of the machine. The subsequent rocking of levers 264 and 265 will restore the raised number one factor key as previously described and, the circuit to solenoid A thus being broken, the full cycle stopping means will operate. In this operation the carriage clutch setting and shifting means will have acted in the manner previously described.

*Example of operation*

The following problem, and description, will illustrate the manner in which the values of the incoming digit line circuits are adapted to be changed by the various switchboard panels B, C, D, etc. to values representing the product of two factors.

If 376 is to be multiplied by the value 534

First step

|  |  |  |
|---|---|---|
|  | 376 |  |
|  | 4 |  |
| Tens value of the product of two factors | 24 |  |
|  | 28 | Units value of the product of 2 factors |
|  | 12 |  |
|  | 284 | Registered after first revolution |
|  | 122 |  |
|  | 1504 | Registered after second revolution |

Second step

|  |  |  |
|---|---|---|
|  | 376 |  |
|  | 3 |  |
|  | 18 |  |
|  | 21 |  |
|  | 09 | units |
| tens | 918 |  |
|  | 1504 |  |
|  | 10684 | Registered after first revolution |
|  | 021 |  |
|  | 12784 | Registered after second revolution |

Third step

|  |  |  |
|---|---|---|
|  | 376 |  |
|  | 5 |  |
|  | 30 |  |
|  | 35 |  |
|  | 15 | units |
|  | 550 |  |
| tens | 12784 |  |
|  | 67784 | Registered after first revolution |
|  | 133 |  |
|  | 200784 | Registered after second revolution |

The multiplicand 376 is set up on the digit keys 12 of the keyboard, and the factor key 167 corresponding to the value of the units denomination of the multiplier (the value 4 of the problem here illustrated) is operated. The value 6 digit key of the units denomination of the keyboard will close the circuit of the sixth level of plates 173 in section *a* of the panels B, C, D, etc.; the digit key 7 of the tens column of the keyboard will close the circuit of the seventh level of plates in section *b* of said panels, and the digit key 3 in the hundreds denomination will close the circuit of the third level of plates in section *c*.

As previously described there are five contact pins 28 to each level, for each section, the three central pins being connected in each level to the corresponding plate, and the two end pins connected to plates 173, according to the table of multiplication shown in Fig. 20.

If no switchboard panel were shifted, the circuits just described would continue unchanged through their respective levels and sections, to their corresponding result lines.

The panel D, however, corresponding to the number 4 factor key, will be shifted one step at the start of the first cycle of operation, the wipers 29 in the sixth level of section *a* panel C will therefore contact with the left hand pin of the sixth level of panel D, and said pin being connected, as shown by the table of Fig. 20 and as indicated by the small diameter holes of Fig. 18, to the fourth level plate 173 of said panel D, will change the level of the circuit to the fourth level to thus convert the digit value 6 to a value 4, and the circuit will continue, in the fourth level through the remaining panels of the switchboard through the center pins, to the result line 4ª, whence it is carried to the number 4 selecting magnet, controlling setting means for the registration of a value 4, as previously described.

In like manner the shifting of panel D will have also changed the incoming seventh level of section *b* to the eighth level, to thus convert the value 7 to 8, and in like manner the third level of section *c* will be changed to the second level, to convert the value 3 of the hundreds denomination to 2. Thus we have the units value of the product of the factors 6 x 4, 7 x 4 and 3 x 4, namely 284, adapted to be registered upon the dials 95 during the first cycle of operation.

At the start of a second revolution, the panel D will again be shifted, as previously described, and the wiper 29 in the sixth level of section *a* panel C will contact with the right hand pin in the sixth level section *b* panel D.

As shown by Figs. 18 and 20, said pin is connected to the plate 173 in the second level and will therefore convert the value 6 to the value 2 and, as the circuit is also shifted from section *a* of the units order to section *b* of the tens order, the value 2 will be 2 tens. In like manner, the incoming circuits of the seventh level of section *b* will be changed to the second level of section *c*, to convert the digit value 7 of the tens order to the value 2 in the hundreds order, and the incoming circuit of the third level of section *c* will be changed to the first level of section *d*, to convert the digit value 3 of the hundreds order to the value 1 in the thousands order. It can thus be seen that the converted value 2, first described, represents the tens value of the product of the factor 4, times the factor 6 of the units column of the multiplicand, the second converted value 2 represents the tens value of the product of the factor 4, times the factor 7 of the tens order of the multiplicand, and the converted value 1 represents the tens value of the product of the factor 4, times the factor 3 of the hundreds denomination of the multiplicand.

At the end of the second cycle of operation the carriage will have been shifted one step, as previously described, and the second step of the problem, that of multiplying the multiplicand 376 by the factor 3 of the tens order of the multiplier, will then be performed, and the panel C corresponding to the factor key 3 will be shifted, in like manner, to convert the incoming digit key values 376 to values representing the product of the factors 6 by 3, 7 by 3 and 3 by 3, and said converted values will be added to the value accruing from the first step, in the manner shown in the illustrated problem, and each succeeding step will function in like manner.

As shown in Figs. 3–5 and 21 the keys 12 and 167 have the lower portion of the key buttons colored in contrast with the keyboard and upper portions of said buttons. In the above figures the keys 12 and 167 are shown with the lower portion of the key buttons normally below the surface of the keyboard plate, said portion being marked with stripes the object being when a key is raised that said striped portion will be easily discernible above the keyboard plate to indicate clearly the value which has been set.

I claim:

1. In a calculating machine having numeral wheels, differentially settable actuators therefor including stepped gears, intermediate gearing between said actuators and said wheels, and driving means for said stepped gears; means for setting said actuators to bring a selected number of teeth of the stepped gears into operative relation, including stops corresponding to the steps of the actuator gears, electric circuit devices for adjusting said stops, and actuator setting devices movable into contact with the adjusted stops.

2. In a calculating machine having numeral wheels, differentially settable actuators therefor including two-part cumulative value cooperating members, intermediate gearing between said actuators and said wheels, and driving means for said actuators; means for setting selected values in said actuators, including opposed stops, electric circuit devices for adjusting said stops, and two-part actuator setting devices movable oppositely into contact with the adjusted stops.

3. In a calculating machine having numeral wheels, differentially settable actuators therefor including two-part cumulative value cooperating members, intermediate gearing between said actuators and said wheels, and driving means for said actuators; means for setting selected values in said actuators, including opposed stops, electric circuit devices for adjusting said stops, two-part actuator setting devices movable oppositely into contact with the adjusted stops, zero stops adapted for adjustment between the parts of each setting device, means operable by the driving means to adjust said zero stops to active position, and a device operable to disable the related zero stop when one of said opposed stops is adjusted to active position.

4. In a calculating machine having a series of numeral wheels, a series of differentially settable actuators therefor, said wheels and said actuators being relatively shiftable to change the denominational value of the set amount, and motor drive means for said actuators; means including electric circuit devices, multiplicand keys and multiplier keys for setting the product of two selected factor values in said actuators, operating connections between said multiplier keys and said motor drive means, and means controlled by said multiplier keys for effecting a denominational shift of said wheels and actuators.

5. In a calculating machine having a series of numeral wheels, a series of differentially settable actuators therefor, said wheels and said actuators being relatively shiftable to change the denominational value of the set amount, and motor drive means for said actuators; means including electric circuit devices, multiplicand keys and multiplier keys for setting the product of two selected factor values in said actuators, operating connections between said multiplier keys and said motor drive means, means controlled by certain of said multiplier keys for effecting a denominational shift of said wheels and actuators at the end of the second cycle of operation of said actuators, and cooperating means controlled by another multiplier key for effecting said shift at the end of the first cycle of operation.

6. In a calculating machine having numeral wheels, differentially settable actuators therefor, and motor drive means for said actuators; means including multiplicand selecting means, electric circuit devices and multiplier keys for setting the product of two selected factor values in said actuators, and operating connections between said multiplier keys and said motor drive means.

JOHN BRICKEN.